(12) United States Patent
Sugiyama

(10) Patent No.: US 8,478,103 B2
(45) Date of Patent: Jul. 2, 2013

(54) VIDEO APPARATUS, VIDEO OUTPUT CONTROL METHOD, AND REPRODUCTION CONTROL METHOD

(75) Inventor: Koichi Sugiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 1501 days.

(21) Appl. No.: 11/248,909

(22) Filed: Oct. 12, 2005

(65) Prior Publication Data

US 2006/0082652 A1    Apr. 20, 2006

(30) Foreign Application Priority Data

Oct. 14, 2004    (JP) ................ P2004-299506
Dec. 21, 2004    (JP) ................ P2004-369818
Feb. 18, 2005    (JP) ................ P2005-042914

(51) Int. Cl.
*H04N 5/765* (2006.01)

(52) U.S. Cl.
USPC ......................................... 386/231

(58) Field of Classification Search
USPC ............. 386/95, 46, 125–126, 124, 200, 201, 386/209, 210, 216, 231, 232, 239, 248
See application file for complete search history.

(56) References Cited

U.S. PATENT DOCUMENTS

| 5,359,365 | A | * | 10/1994 | Enokida ................ 348/390.1 |
| 5,841,937 | A | * | 11/1998 | Shima et al. ............... 386/40 |
| 6,131,130 | A | * | 10/2000 | Van Ryzin ................. 710/6 |
| 6,329,998 | B1 | * | 12/2001 | Han ...................... 345/581 |
| 6,356,968 | B1 | * | 3/2002 | Kishon .................. 710/306 |
| 6,366,964 | B1 | | 4/2002 | Shima et al. |
| 6,437,834 | B1 | * | 8/2002 | Tagami .................. 348/705 |
| 6,496,896 | B1 | * | 12/2002 | Inoue ..................... 710/306 |
| 6,731,347 | B1 | | 5/2004 | Takano et al. |
| 6,930,730 | B2 | * | 8/2005 | Maxon et al. ............ 348/734 |
| 7,043,138 | B1 | * | 5/2006 | Wakahara et al. ......... 386/239 |

FOREIGN PATENT DOCUMENTS

| JP | 7 78453 | 3/1995 |
| JP | 11 112870 | 4/1999 |
| JP | 2001 35087 | 2/2001 |
| JP | 2001 43184 | 2/2001 |
| JP | 2001 84214 | 3/2001 |

(Continued)

OTHER PUBLICATIONS

Kunzman A J et al; "1394 High Performance Serial Bus: The Digital Interface for ATV" IEEE Transactions on Consumer Electronics, IEEE Inc. New York, US vol. 41, No. 3, Aug. 1995, pp. 893-900, XP000539552 ISSN: 0098-3063.

(Continued)

*Primary Examiner* — Tat Chio
(74) *Attorney, Agent, or Firm* — Frommer Lawrence & Haug LLP; William S. Frommer

(57) ABSTRACT

A video apparatus includes signal control unit that outputs an image signal in a plurality of formats. An interface unit connects the video apparatus to a computer, and an interface control unit controls transmission of the image signal to the computer. When the video apparatus has been connected to the computer through the interface unit, when the format of the image signal is switched, the interface control unit controls the interface unit so that the connection to the computer is disconnected without changing a physical connecting state. After the elapse of a predetermined period, the video apparatus is connected to the computer again without changing the physical connecting state.

23 Claims, 19 Drawing Sheets

FOREIGN PATENT DOCUMENTS

| | | |
|---|---|---|
| JP | 2002 94938 | 3/2002 |
| JP | 2002 94942 | 3/2002 |
| JP | 2002 510416 | 4/2002 |
| JP | 2003 61046 | 2/2003 |
| JP | 2003 132633 | 5/2003 |
| JP | 2004-112586 | 4/2004 |
| JP | 2004 228757 | 8/2004 |
| JP | 2004-326849 | 11/2004 |

OTHER PUBLICATIONS

'Online! XP002359311 Camcorderinfo.com Message Board—Installing the JVC Mpeg Driver for PCs; dated Jan. 12, 2003; Retrieved from the Internet: URL:http://www.camcorderinfo.com/bbs/showthread.php?mode=hybrid&t-32909> 'retrieved on Nov. 15, 2005! Passage titled "Installing the JVC Mpeg Device Driver for PCs".

* cited by examiner

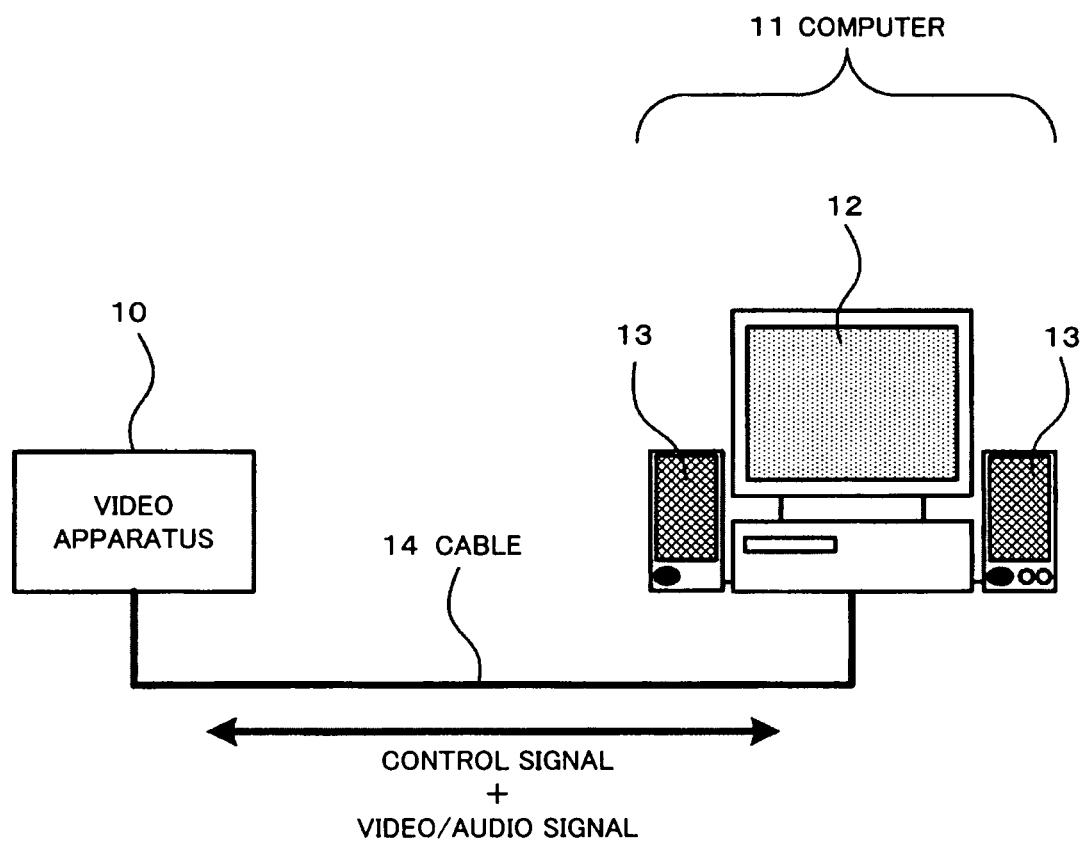

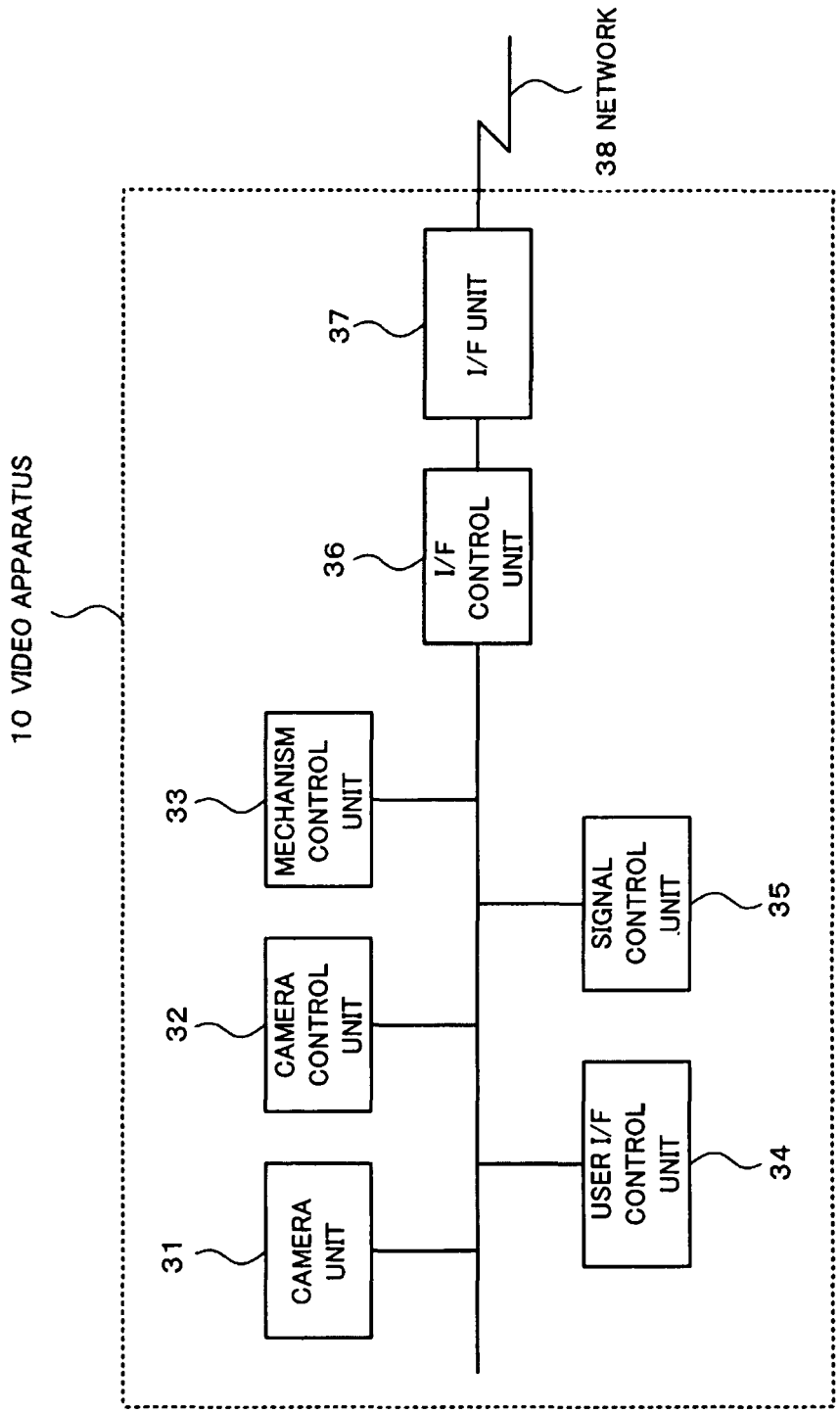

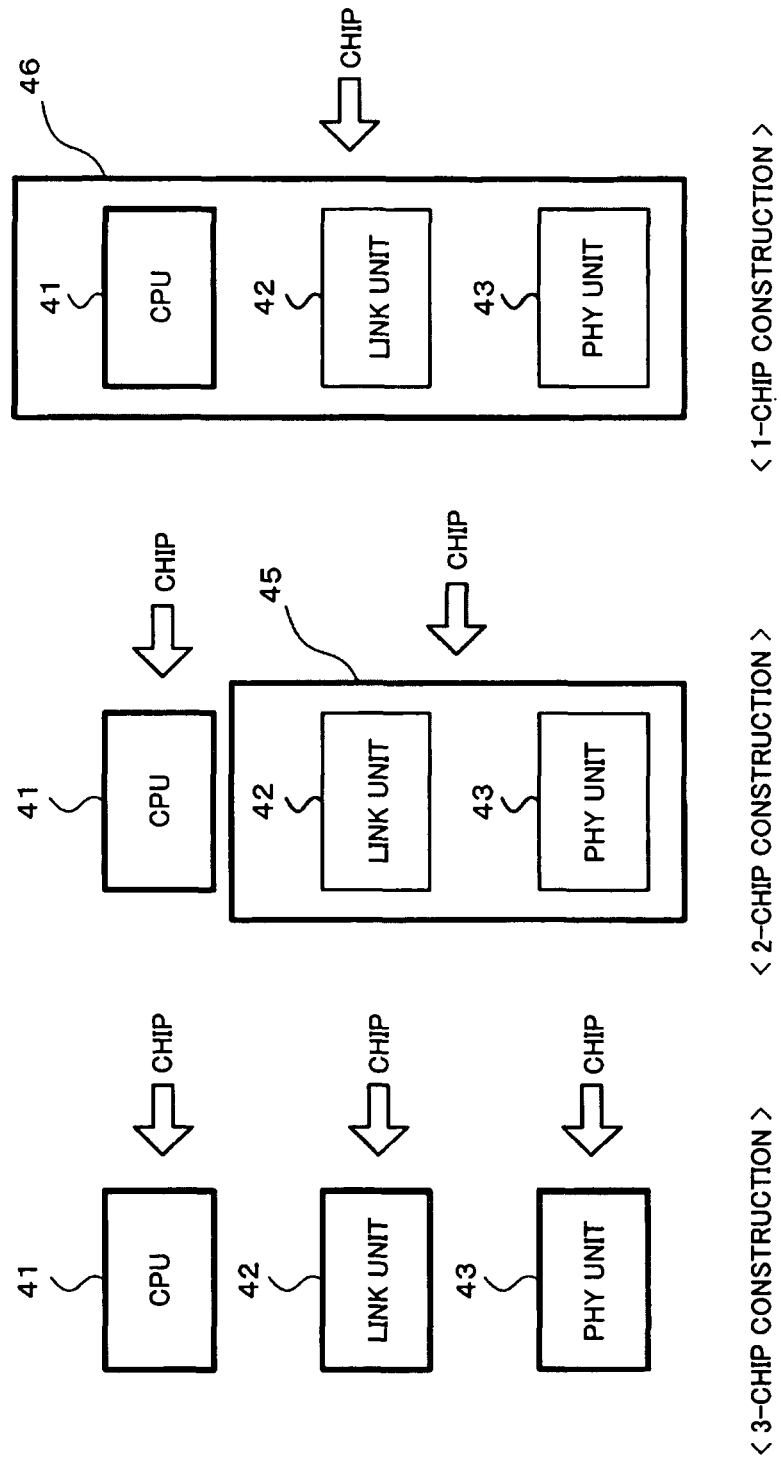

Fig. 7A

WHEN HDV MODE IS SELECTED (1-1) DUMMY TRANSMISSION

| RECORDING MODE ON MEDIA | MPEG | DV | MPEG | DV |
|---|---|---|---|---|
| OUTPUT SIGNAL | MPEG | MPEG DUMMY | MPEG | MPEG DUMMY |

REPRODUCE → REPRODUCE → REPRODUCE → REPRODUCE

Fig. 7B (1-2) SKIP

| RECORDING MODE ON MEDIA | MPEG | DV | MPEG | DV |
|---|---|---|---|---|
| OUTPUT SIGNAL | MPEG | (MPEG DUMMY) | MPEG | (MPEG DUMMY) |

REPRODUCE → SKIP → REPRODUCE → SKIP

Fig. 7C (1-3) SIGNAL CONVERSION

| RECORDING MODE ON MEDIA | MPEG | DV | MPEG | DV |
|---|---|---|---|---|
| OUTPUT SIGNAL | MPEG | MPEG | MPEG | MPEG |

REPRODUCE → REPRODUCE → REPRODUCE → REPRODUCE

DV→MPEG CONVERSION    DV→MPEG CONVERSION

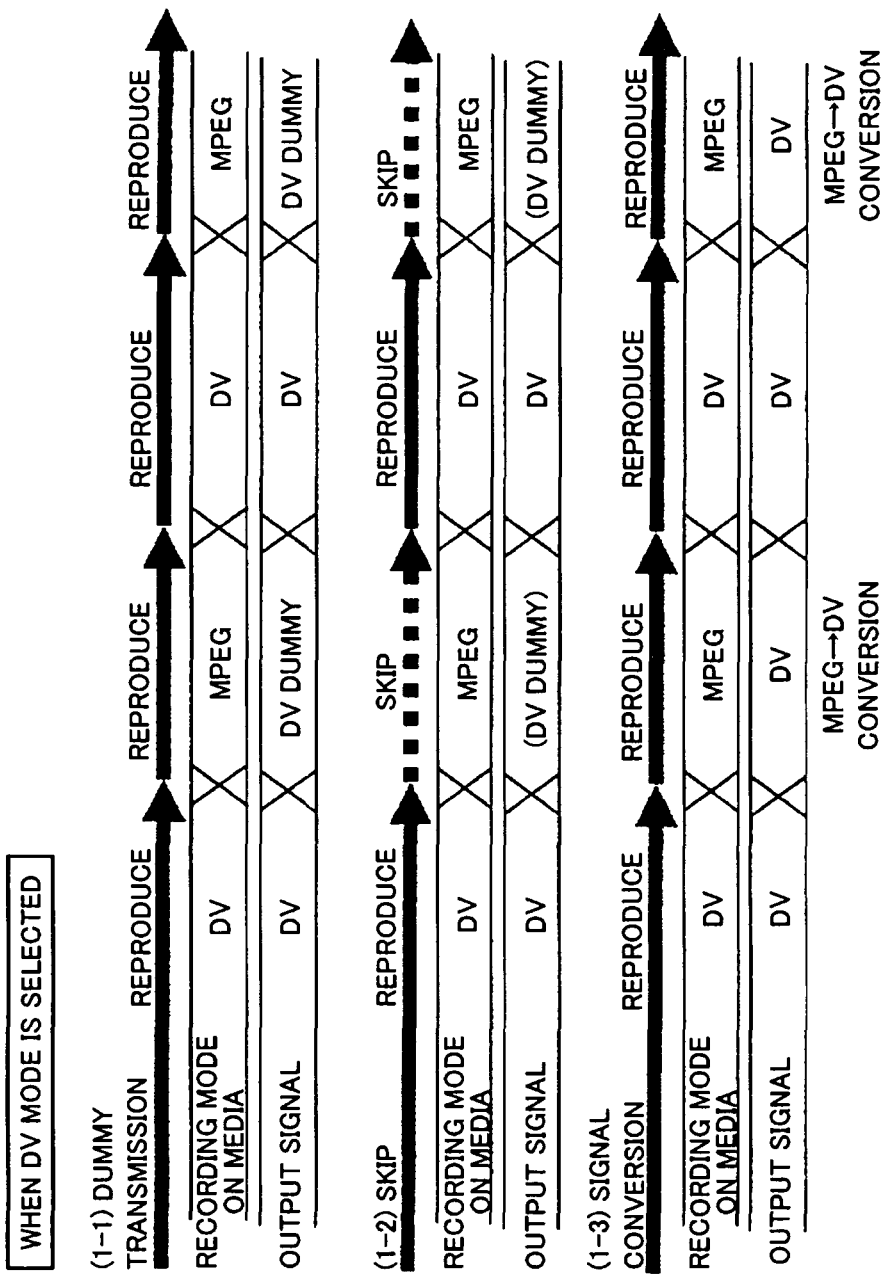

Fig. 9
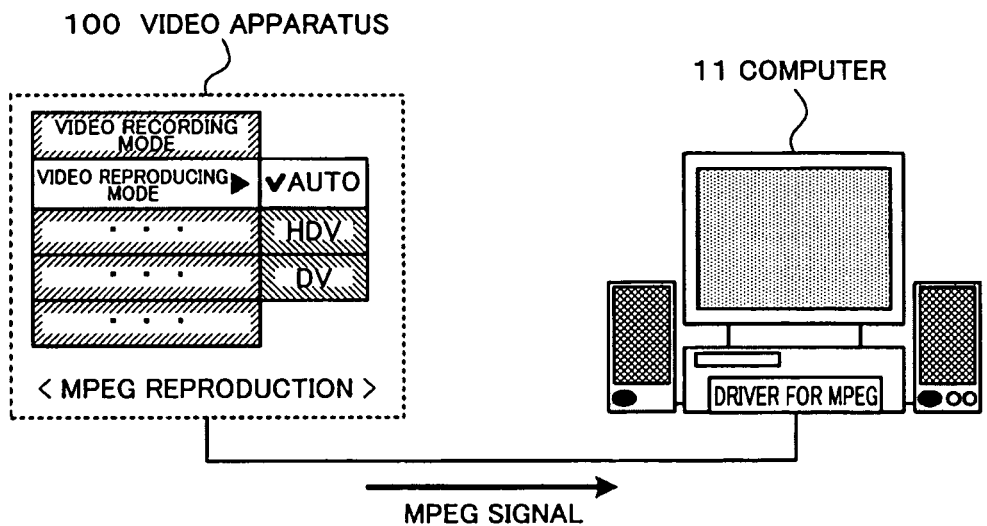
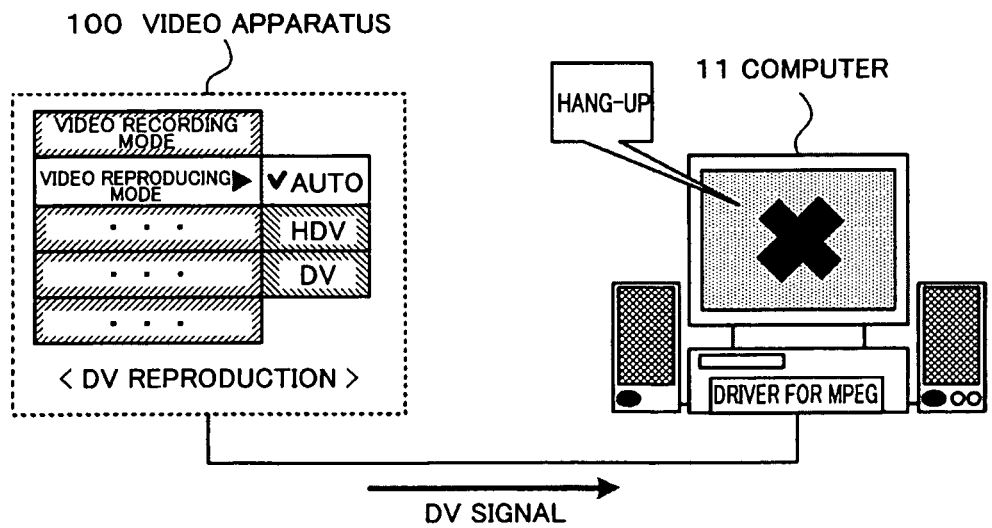

Fig. 10
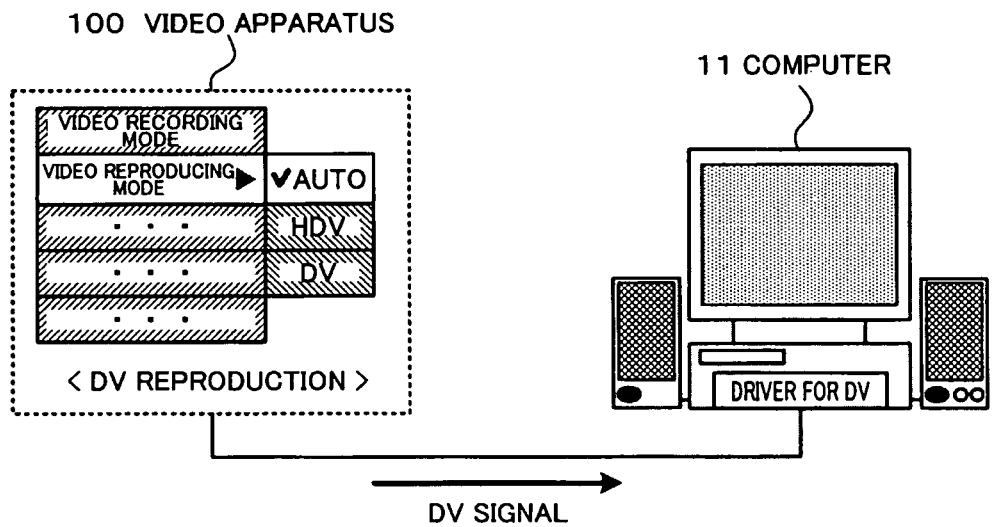
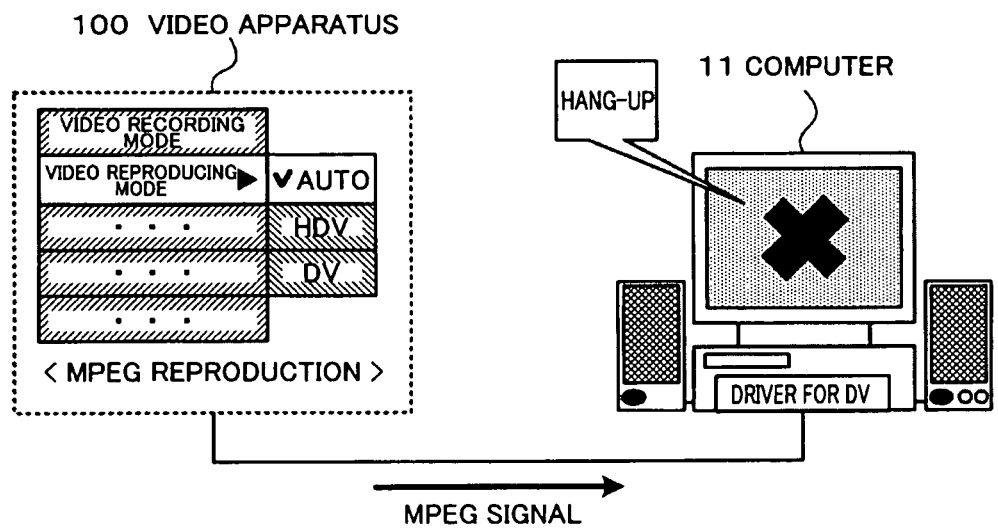

Fig. 11
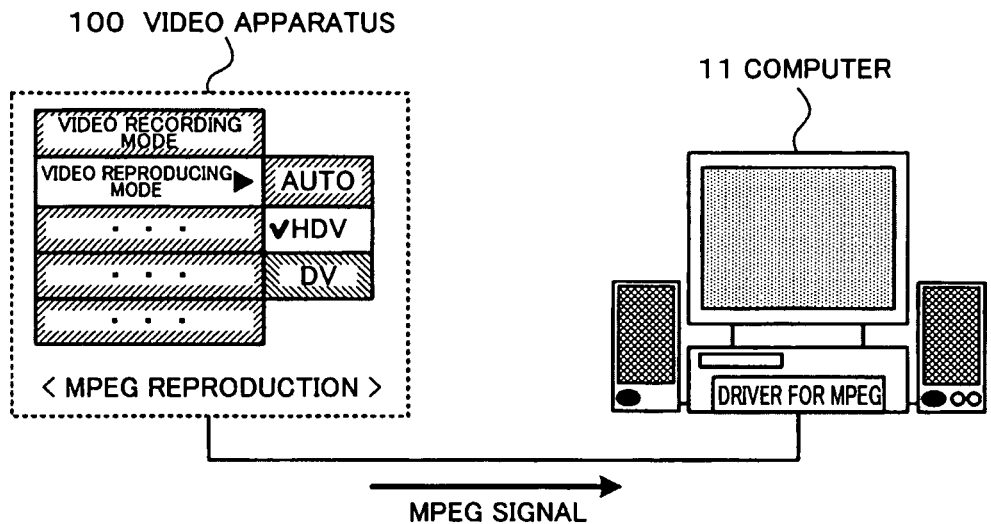
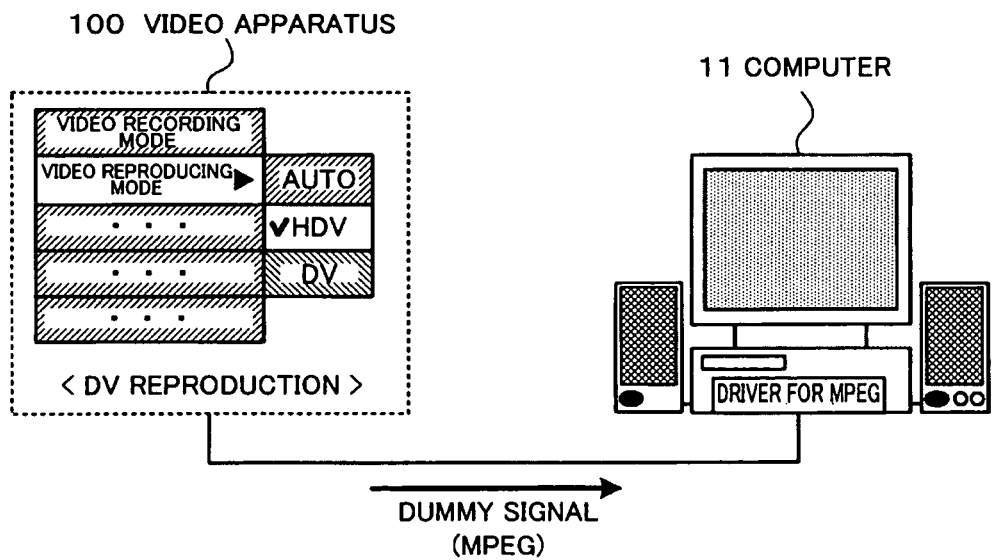

Fig. 12
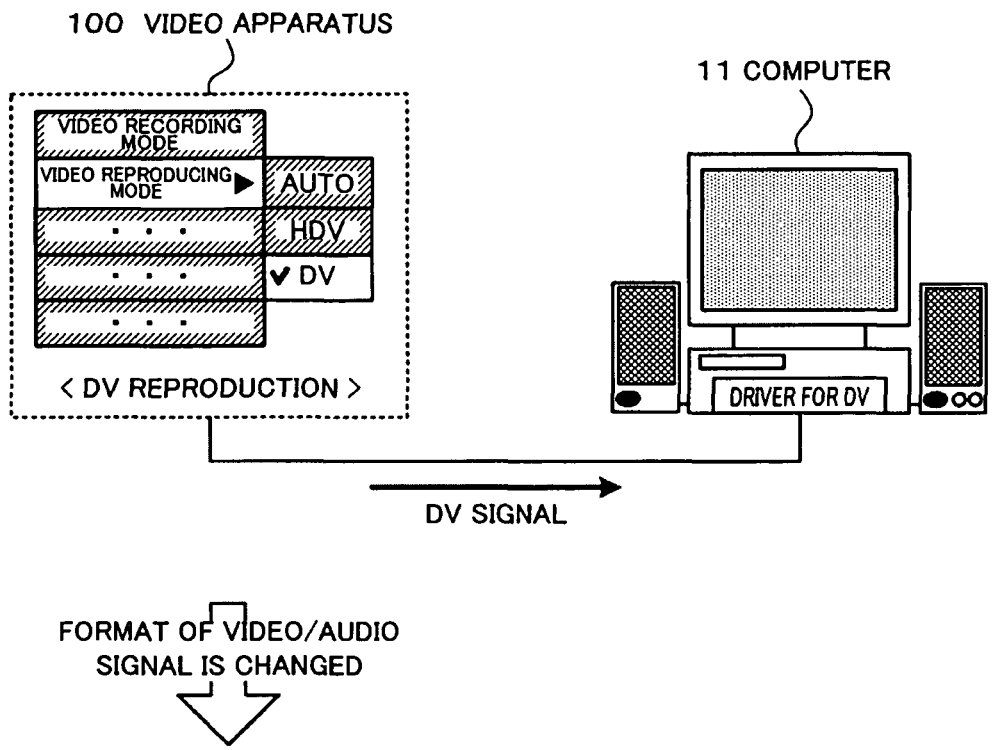
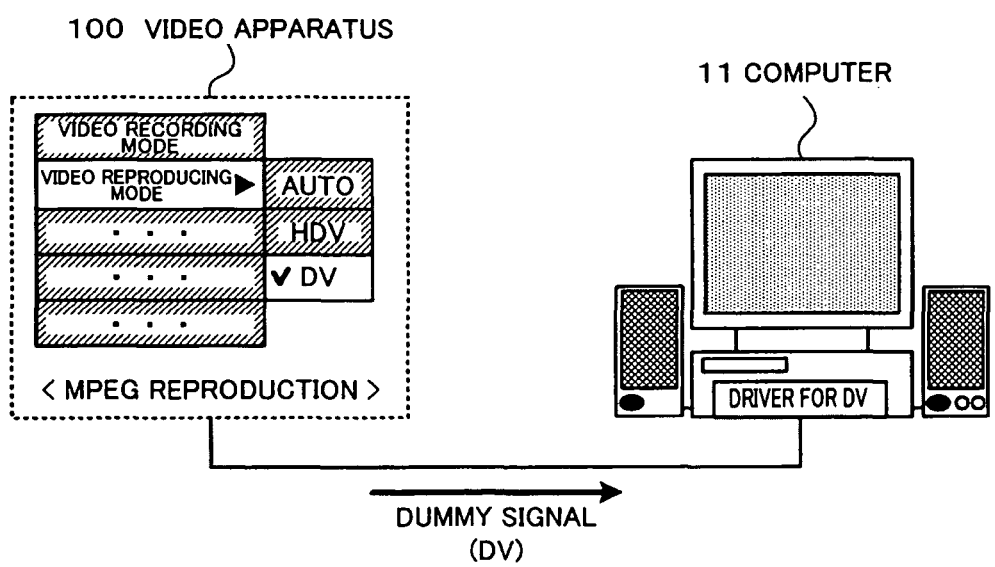

Fig. 13
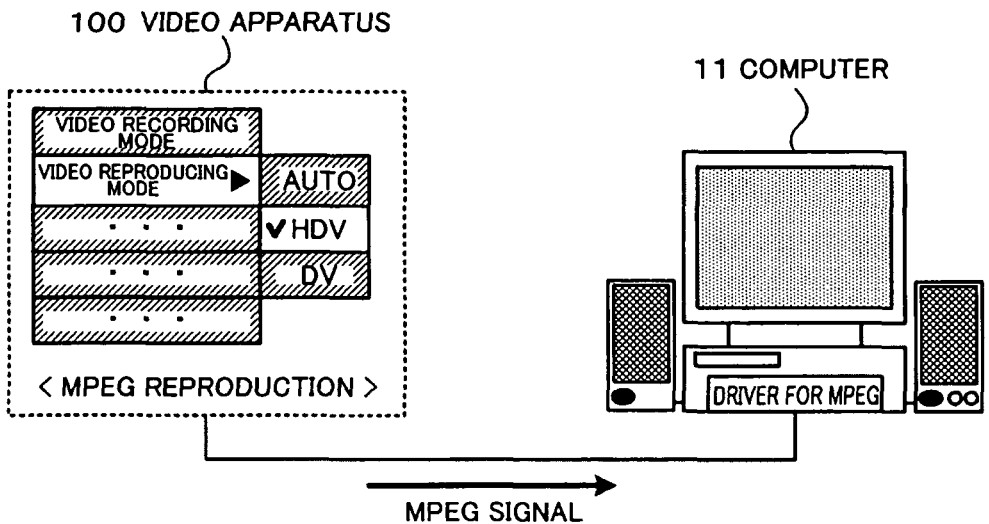
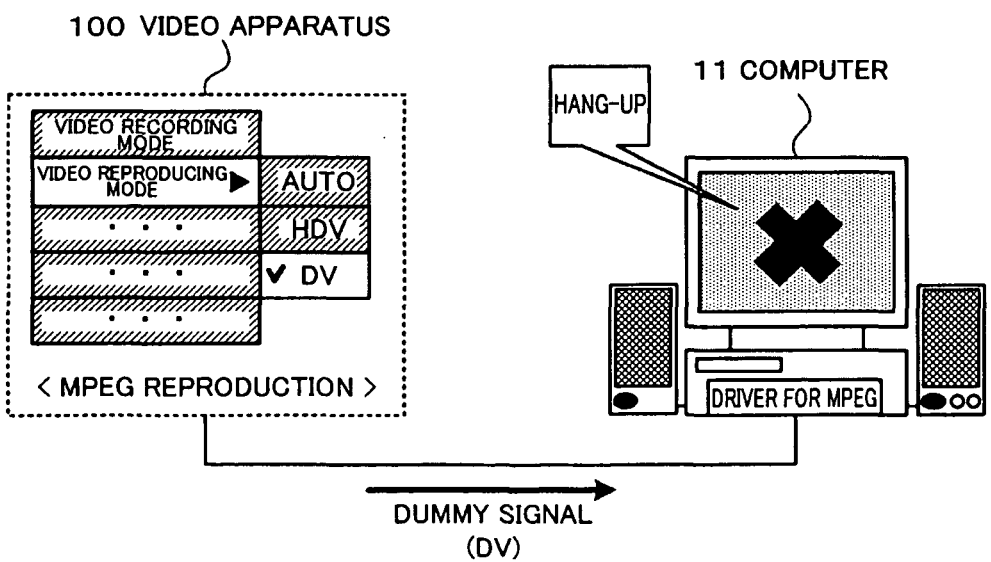

Fig. 14
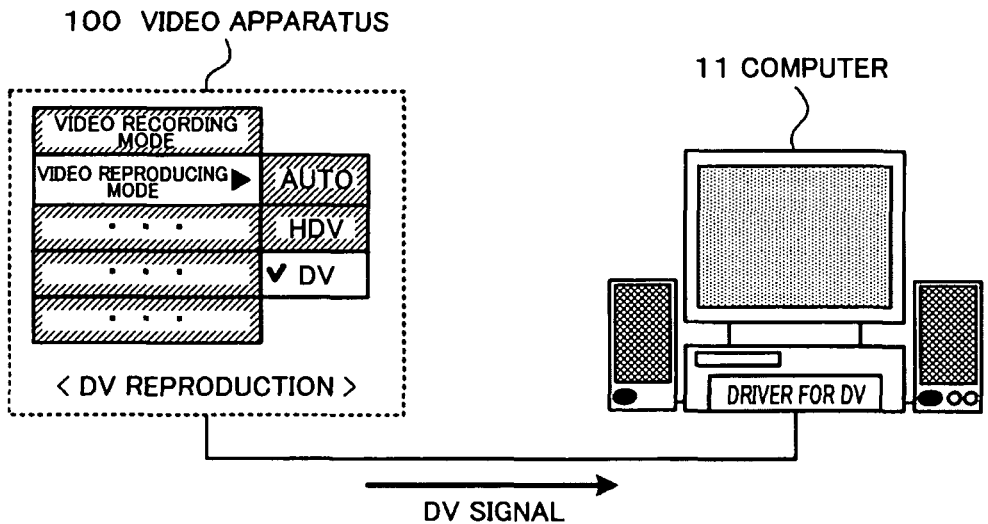
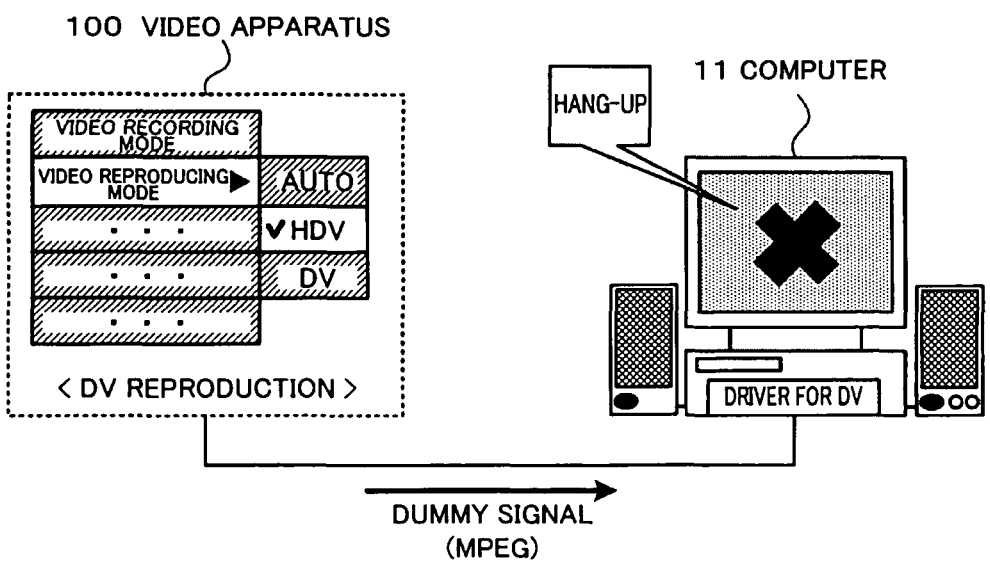

VIDEO APPARATUS, VIDEO OUTPUT CONTROL METHOD, AND REPRODUCTION CONTROL METHOD

CROSS REFERENCES TO RELATED APPLICATIONS

The present invention contains subject matter related to Japanese Patent Application No. 2004-299506 filed on Oct. 14, 2004, Japanese Patent Application No. 2004-369818 filed on Dec. 21, 2004 and Japanese Patent Application No. 2005-042914 filed on Feb. 18, 2005, the entire contents of which being incorporated herein by reference.

BACKGROUND OF THE INVENTION

1. Field of the Invention

The invention relates to a video apparatus which can output video/audio signals in a plurality of formats and to a control method of outputting an image signal in such a video apparatus.

2. Description of the Related Arts

In recent years, video apparatuses such as a video camera apparatus and the like have remarkably been widespread. A use form in which a motion image or a still image recorded in a recording media such as tape, disk, or the like by the video apparatus is outputted to a computer such as a personal computer or the like or a television apparatus and monitored is also being generalized. Such a monitoring form is realized merely by connecting the video apparatus and the computer or the like with a predetermined cable and executing a predetermined simple operation.

Functions of the video camera apparatuses which have remarkably been spread as mentioned above are also remarkably being improved. For example, an apparatus of a model in which video/audio signals of different formats can be mixedly recorded into the same recording media has also been proposed. As an example of such a video/audio signal format, a combination of a DV (Digital Video) format and an HDV (High Definition Video) (registered trademark) format can be mentioned.

The DV format is a recording format which is widely used in commercially available video camera apparatuses and data is compressed data fixed rate of about 3.5 Mb/sec. Video quality can be made as close as possible to the quality of a broadcasting level as close as possible owing to such a compression rate. Since video/audio data is converted into digital data and recorded onto a tape, it can be copied into a disk device of the computer through the cable or its backup copy can be recorded onto the tape without causing a deterioration in quality which occurs in an analog copy. A recording media which is used in the video camera apparatus using such a recording format is a DV cassette tape or a mini DV cassette tape. According to the mini DV cassette tape, it is physically smaller than the DV cassette tape and a recording possible time is shorter.

In the HDV format, there are a 720p (progressive) system and a 1080i (interlace) system and the recording and reproduction of a high fine HD (High Definition) video image can be executed. A video format is MPEG2 (Moving Picture Experts Group phase 2). The data is compressed at a rate of about 19 Mb/sec in the case of the progressive system or about 25 Mb/sec in the case of the interlace system.

According to the HDV standard, since the same cassette, tape speed, and track pitch as those of the DV standard are used, compatibility with articles of the DV standard is high. More specifically speaking, it is possible to add the recording/reproducing function according to the HDV format to the video camera apparatus of the DV standard and record the video/audio signals of both formats onto one tape or the like.

However, if such a video camera apparatus corresponding to both of the DV format and the HDV format is connected to the computer via a cable specified by, for example, IEEE (The Institute of Electrical and Electronics Engineers, Inc.) 1394 (IEEE1394 cable) and the format of the output image (reproduction image) is switched during the reproduction, there is a case where such a problem that the computer side hangs up occurs.

Such a problem occurs by the following reason: that is, when the computer is connected to the video camera apparatus by the IEEE1394 cable, a dedicated driver of the format used by the video camera apparatus (which is being reproduced at this point of time) is read, and after that, transmission and reception of the data to/from the video camera apparatus are executed through such a driver for a period of time during which they are connected by the IEEE1394 cable.

That is, when the computer is connected to the video camera apparatus by the IEEE1394 cable, whether the video camera apparatus corresponds to the DV format or the HDV format (MPEG2) is discriminated on the basis of the IEEE1394 standard. The driver corresponding to the format of the video camera apparatus is read as a result of the discrimination and, after that, the transmission and reception of the data to/from the video camera apparatus are executed through such a driver until the computer is disconnected (shut off) from the video camera apparatus. Thus, when the computer receives the video/audio signals of the different formats from the video camera apparatus during the reproduction, it is difficult for the driver to cope with such a situation and an inconvenience such as hang-up of the computer itself or the like is caused.

To avoid such a problem, therefore, it is necessary to interrupt the connection between the video camera apparatus and the computer once each time the format of the data to be outputted (reproduced) is changed and connect them again. For such a process, for example, it is necessary to physically pull out or insert the cable.

On the other hand, in JP-B-8-31063, there has been disclosed such a technique that if an information apparatus such as a computer or the like and a peripheral apparatus such as a storing device are connected, when an error signal from the peripheral apparatus is detected, the information apparatus disconnects an interface between both apparatuses while keeping only a part of the interface, and when a recovery signal indicative of the recovery from the error is detected, the interface is connected again.

In JP-A-11-163912, a network control apparatus which can remote-control so that a node connected to an IEEE1394 bus is automatically disconnected from a network has been disclosed.

Further, among the video camera apparatuses which have so far been commercially available and cope with the recording and reproduction of the HDV format and the DV format, there is an apparatus in which the disconnection (shut-off) and re-connection of the IEEE1394 bus are performed by a hardware switch.

SUMMARY OF THE INVENTION

However, a method whereby, in order to avoid an inconvenience such as hang-up of the computer or the like as mentioned above, each time the format of the video/audio signals which are outputted from the video camera apparatus changes, the cable is pulled out and inserted so that the connection between the video camera apparatus and the computer is disconnected once and, after that, they are connected again is not a practical counter measure for solving such a problem. This is because there is a case where the data of the HDV format and the DV format are mixedly recorded in the recording media such as a DV cassette tape or the like and there is a possibility that the data format changes frequently in a series of reproducing processes of the DV cassette tape in accordance with the recording order.

There is also a method whereby the user erroneously operates a menu or the like of the video camera apparatus and instructs the apparatus to reproduce the data of the DV format while the data of the HDV format recorded on the DV cassette tape is being reproduced or, contrarily, instructs the apparatus to reproduce the data of the HDV format while the data of the DV format is being reproduced. Such an erroneous operation often occurs in the case where, for example, the user mistakes the reproducing mode and the recording mode of the video camera apparatus, or the like.

Further, according to the technique disclosed in JP-B-8-31063, when the error signal from the connected peripheral apparatus is detected, a part of the interface between both apparatuses is disconnected instead of disconnecting the whole interface. Further, according to this technique, the error signal from the peripheral apparatus and the recovery signal from the error are detected and the disconnection and re-connection of the interface are performed and errors which are caused by the operation of the information apparatus itself are not prevented. It is actually an object of such a technique to improve the security of the data stored in the peripheral apparatus such as a storing device and such a technique is not a technique which can be used to avoid the occurrence of the inconvenience such as hang-up or the like of the computer as mentioned above.

Moreover, according to the network control apparatus disclosed in JP-A-11-163912 mentioned above, when 64 or more nodes are erroneously connected to the IEEE1394 bus, remote control is made so that an arbitrary unnecessary node which does not perform the data transmission is disconnected from the network system. Such a technique that the occurrence of the inconvenience such as hang-up or the like as mentioned above is avoided by applying such an apparatus cannot be realized from a viewpoint of its object and construction.

Further, according to the video camera apparatus having the hardware switch mentioned above, it is impossible that the video camera apparatus and the computer are automatically disconnected and re-connected without intervention of the user. The existence of such a hardware switch not only makes the operation of the user more complicated but also becomes an obstacle to the reduction in the number of parts of the video camera apparatus and the miniaturization thereof.

According to an embodiment of the invention, therefore, there is provided a video apparatus which can output video/audio signals in a plurality of formats, wherein when the format of the video/audio signals which are outputted to a computer is switched, the connection between the video apparatus and the computer is automatically disconnected and re-connected without physically pulling out and inserting a cable and to provide a video output control method for such a video apparatus.

According to the first embodiment of the invention, it is desirable to provide a video apparatus comprising: signal control means for outputting an image signal in a plurality of formats; interface means for connecting the video apparatus to a computer; and interface control means for controlling so as to transmit the image signal to the computer by using the interface means, wherein in the case where the video apparatus has been connected to the computer through the interface means, when the format of the image signal is switched, the interface control means controls the interface means in such a manner that the connection to the computer is disconnected without changing a physical connecting state and, further after the elapse of a predetermined period, the video apparatus is connected to the computer again without changing the physical connecting state.

According to the second embodiment of the invention, in the video apparatus of the first embodiment of the invention, the predetermined period is set to a time which is equal to or longer than a time during which the computer can detect the disconnection of the connection.

According to the first and second embodiments, even if the format of the image signal changes while the video apparatus is transmitting (reproducing) the image signal to the computer, a driver of the computer side is changed to a proper driver, so that a risk of occurrence of an inconvenience such as hang-up of the computer or the like is eliminated.

According to the third embodiment of the invention, it is desirable to provide a video output control method comprising: a transmitting step of controlling so that an image signal which can be outputted in a plurality of formats is transmitted to a computer through interface means for connecting a video apparatus to the computer; and a disconnecting/re-connecting step of, in the case where the video apparatus has been connected to the computer in the transmitting step and when the format of the image signal is switched, controlling the interface means, disconnecting the connection to the computer without changing a physical connecting state, and further after the elapse of a predetermined period, connecting the video apparatus to the computer again without changing the physical connecting state.

According to the fourth embodiment of the invention, in the video output control method of the third embodiment of the invention, the predetermined period is set to a time which is equal to or longer than a time during which the computer can detect the disconnection of the connection.

According to the third and fourth embodiments, even if the format of the image signal changes while the video apparatus is transmitting (reproducing) the image signal to the computer, a driver of the computer side is changed to a proper driver, so that a risk of occurrence of an inconvenience such as hang-up of the computer or the like is eliminated.

According to the fifth embodiment of the invention, it is desirable to provide a reproduction control method in a recording/reproducing apparatus having a recording/reproducing function of recording/reproducing a signal through a recording medium so that a plurality of signal formats mixedly exist and a communicating function of establishing connection to an external apparatus and outputting a reproduction signal, comprising: a transmitting step of controlling so that a video signal which can be outputted in a plurality of formats is transmitted to the external apparatus through interface means for connecting the recording/reproducing apparatus to the external apparatus; a disconnecting/re-connecting step of, in the case where the recording/reproducing apparatus has been connected to the external apparatus in the transmitting step and when the format of the video signal is switched, controlling the interface means, disconnecting the connection to the external apparatus without changing a physical connecting state, and further after the elapse of a predetermined period, connecting the recording/reproducing apparatus to the external apparatus again without changing the physical connecting state; and a reproduction control step of controlling the reproducing operation of the recording/ reproducing apparatus, wherein in the reproduction control step, when a reproducing mode has been set to a specific reproducing mode, the reproduction of a recording portion of the format which does not correspond to the reproducing mode is skipped.

According to the sixth embodiment of the invention, it is desirable to provide a reproduction control method in a recording/reproducing apparatus having a recording/reproducing function of recording/reproducing a signal through a recording medium so that a plurality of signal formats mixedly exist and a communicating function of establishing connection to an external apparatus and outputting a reproduction signal, comprising: a transmitting step of controlling so that a video signal which can be outputted in a plurality of formats is transmitted to the external apparatus through interface means for connecting the recording/reproducing apparatus to the external apparatus; a disconnecting/re-connecting step of, in the case where the recording/reproducing apparatus has been connected to the external apparatus in the transmitting step and when the format of the video signal is switched, controlling the interface means, disconnecting the connection to the external apparatus without changing a physical connecting state, and further after the elapse of a predetermined period, connecting the recording/reproducing apparatus to the external apparatus again without changing the physical connecting state; and a video output control step of controlling the video outputting operation of the recording/reproducing apparatus, wherein in the video output control step, when a reproducing mode has been set to a specific reproducing mode, a dummy signal of a format corresponding to the reproducing mode is outputted at the time of the reproduction of a recording portion of the format which does not correspond to the reproducing mode.

According to the fifth and sixth embodiments, even if the format of the video signal changes while the recording/reproducing apparatus is transmitting the video signal to the external apparatus, the connection to the external apparatus is disconnected without changing the physical connecting state, and further after the elapse of the predetermined period, the recording/reproducing apparatus is connected to the external apparatus again without changing the physical connecting state, so that a risk of occurrence of an inconvenience such as hang-up of the external apparatus or the like is eliminated.

Owing to the video apparatus and the video output control method according to the embodiments of the invention, when the format of the video/audio signals which are outputted to the computer is switched, the connection between the video apparatus and the computer is automatically disconnected/re-connected without physically pulling out and inserting the cable. At the re-connection timing, the computer side reads the driver corresponding to the format of the video/audio signals which are outputted from the video apparatus. Therefore, even when the format of the video/audio signals which are outputted from the video apparatus is switched during the reproduction, the inconvenience such as hang-up or the like does not occur.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a schematic diagram showing the state where a video apparatus 10 according to an embodiment of the invention is connected to a computer 11 through an IEEE1394 cable;

FIG. 3 is a block diagram showing a construction of the video apparatus 10 according to the embodiment of the invention;

FIG. 4 is a schematic diagram showing variations of a chip construction of component elements corresponding to an interface control unit and an interface unit of the video apparatus 10 according to the embodiment of the invention;

FIGS. 7A to 7C are diagrams showing specific examples in the case where an MPEG mode of a process which does not output different format signals from the video apparatus is selected in a video system;

FIGS. 8A to 8C are diagrams showing specific examples in the case where a DV mode of a process which does not output different format signals from the video apparatus is selected in a video system;

FIG. 9 is a schematic diagram conceptually showing the operation of a computer in the case where a format of video/audio signals to be outputted is changed during the reproduction in a video apparatus in a related art;

FIG. 10 is a schematic diagram conceptually showing the operation of the computer in the case where the format of the video/audio signals to be outputted is changed during the reproduction in the video apparatus in the related art;

FIG. 11 is a schematic diagram conceptually showing the operation of the computer in the case where the format of the video/audio signals to be outputted is changed during the reproduction in the video apparatus in the related art;

FIG. 12 is a schematic diagram conceptually showing the operation of the computer in the case where the format of the video/audio signals to be outputted is changed during the reproduction in a video apparatus in the related art;

FIG. 13 is a schematic diagram conceptually showing the operation of the computer in the case where a reproducing mode is switched during the output of the video/audio signals in the video apparatus in the related art;

FIG. 14 is a schematic diagram conceptually showing the operation of the computer in the case where the reproducing mode is switched during the output of the video/audio signals in the video apparatus in the related art;

DETAILED DESCRIPTION OF THE PREFERRED EMBODIMENT

Figure 2A:
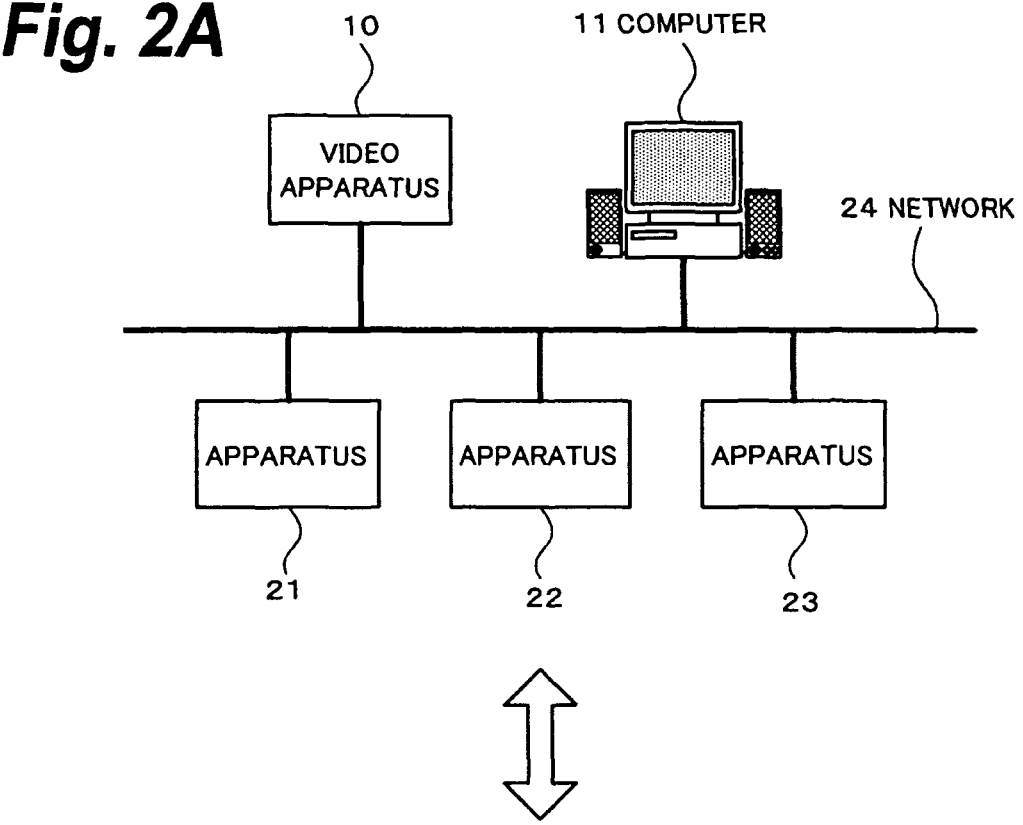
FIGS. 2A and 2B are schematic diagrams conceptually showing how the computer 11 recognizes the video apparatus 10 in the case where the video apparatus 10 according to the embodiment of the invention is connected to an IEEE1394 bus and in the case where it is disconnected.

A video apparatus according to the invention is a video apparatus which can output video/audio signals in a plurality of formats. Not only an apparatus which outputs a motion image but also an apparatus which outputs a still image are included in the video apparatus. In this case, the video apparatus of the invention is the video apparatus which can output video signals in a plurality of formats.

The video/audio signals of a plurality of formats are, for example, a combination of data (signal) of the DV format and data (signal) of the HDV format. Although not only video data but also audio data are generally included in those motion image formats, in the invention, it is sufficient that it is possible to handle at least an image signal (video signal) constructed by a motion image and a still image. In the specification, therefore, an apparatus which outputs the data based on those formats is simply referred to as a "video apparatus".

First, a connecting form of the video apparatus of the invention and a computer will be described with reference to FIG. 1. A video apparatus 10 and a computer 11 according to the invention are shown in FIG. 1 and both of them are connected by an IEEE1394 cable 14. An IEEE1394 bus is formed by such connection. A control signal and the video/audio signals are transmitted and received between the video apparatus 10 and the computer 11 through the IEEE1394 cable 14. The computer 11 is a computer with a general construction in a related art.

A typical example of the transmission and reception of the video/audio signals is a form in which the video/audio signals recorded in a recording media by the video apparatus 10 are outputted to the computer 11 through the IEEE1394 cable 14. The computer 11 executes, for example, a predetermined decoding process with respect to the video/audio signals received from the video apparatus 10, transmits the video signal thus obtained to a monitor 12, thereby displaying a video image, and transmits the audio signal to speakers 13, thereby generating an audio sound.

The video apparatus 10 according to the invention virtually controls in such a manner that the connection between the video apparatus 10 and the computer 11 is disconnected once and, thereafter, re-connected (by software control) at timing when the format is switched so that the computer 11 can normally receive the video/audio signals of a plurality of different formats. According to such virtual control, the substantially the same effect as that obtained in the case where the IEEE1394 cable 14 is physically pulled out and inserted is obtained. During such a virtual process, the IEEE1394 cable 14 is maintained in the state where it is physically connected between the video apparatus 10 and the computer 11. In other words, the physical connecting state between the video apparatus 10 and the computer 11 is not changed.

Figure 2B:
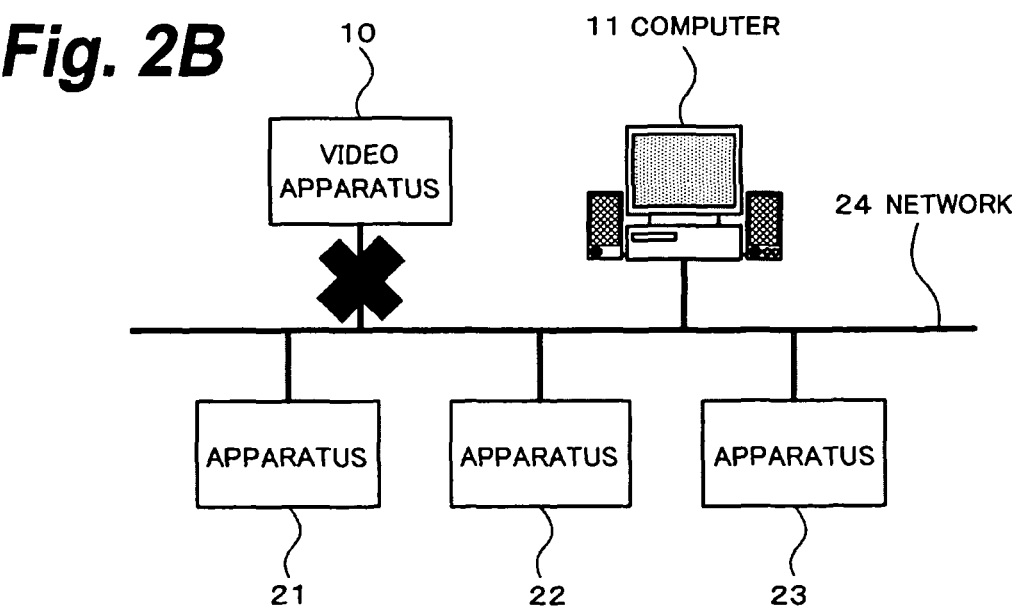

FIGS. 2A and 2B show a concept of such a virtual process of the disconnection/re-connection. FIG. 2A shows the normal state where the video apparatus 10, the computer 11, and apparatuses 21 to 23 are physically connected to a network 24 (in this example, IEEE1394 bus) and are also logically connected. When a list of apparatuses connected to the computer 11 through the network 24 is now displayed by using, for example, a predetermined network tool which operates in the computer 11, the video apparatus 10 and the apparatuses 21 to 23 appear.

FIG. 2B shows the state where the video apparatus 10 is logically disconnected once from the network 24 as mentioned above. In a manner similar to FIG. 2A, although the video apparatus 10, the computer 11, and apparatuses 21 to 23 are physically connected to the network 24, the video apparatus 10 is not logically connected. For example, when a list of the apparatuses connected to the computer 11 through the network 24 is now displayed by using the predetermined network tool which operates in the computer 11, although and the apparatuses 21 to 23 appear, the video apparatus 10 which is not logically connected does not appear.

After the elapse of a predetermined time, the video apparatus 10 is also logically connected to the network 24 again, so that the connecting state is returned from the state as shown in FIG. 2B to the state of FIG. 2A.

A construction of the video apparatus 10 according to the embodiment of the invention will now be described with reference to FIG. 3. The video apparatus 10 includes: a camera unit 31; a camera control unit 32; a mechanism control unit 33; a user interface control unit 34; a signal control unit 35; an interface control unit 36; and an interface unit 37.

The camera unit 31 is constructed by, for example, a shutter, a lens, and an image pickup device such as a CCD (Charge Coupled Device) and outputs a photographed motion image or still image as an electric signal. The camera control unit 32 makes control of the shutter operation, zooming operation, focusing operation, and the like. The mechanism control unit 33 controls the operation of each unit concerning the recording, reproduction, and the like of the video apparatus 10.

The user interface control unit 34 allows a menu display screen instructed by the user to be displayed onto a monitor unit (not shown) of the video apparatus 10 by using an OSD (On-Screen Display) or the like and receives the instruction of the user from the menu display screen. The user interface control unit 34 detects that various buttons (not shown) provided for the video apparatus 10 have been depressed by the user and transmits necessary signals to the mechanism control unit 33 and the like in accordance with the depressed buttons.

The signal control unit 35 has functions of forming a video signal by encoding the electric signal obtained from the camera unit 31 or the like, decoding the video/audio signals recorded in the recording media, and displaying them onto the monitor unit. The signal control unit 35 also has a function of outputting the video/audio signals recorded in the recording media in its own format (or after they were decoded into another format) to the outside through the interface unit 37. The signal control unit 35 further has a function of recording, reproducing, and processing the video/audio signals in a plurality of formats.

When a change in format of the video/audio signals in the recording media or the instruction to change the format by the user is detected, the interface control unit 36 controls so as to perform the logical disconnection with respect to a network 38 and, after the elapse of a predetermined time, controls so as to perform the re-connection of the network 38. The interface unit 37 is connected to, for example, the network 38 as an IEEE1394 bus and operates so as to realize the disconnection and re-connection from/to the network 38 in accordance with the control of the interface control unit 36.

Constructions of the interface control unit 36 and the interface unit 37 will be described further in detail with reference to FIG. 4. In FIG. 4, a CPU 41, a LINK unit 42, and a PHY unit 43 are shown as a 3-chip construction, a 2-chip construction, and a 1-chip construction, respectively. Which one of those constructions should be used is nothing but an item on design. Those chip constructions are merely shown as an example and other various patterns are considered. Fundamentally, the CPU 41 realizes the function of the interface control unit 36 and the LINK unit 42 and PHY unit 43 correspond to the interface unit 37. Although there is a case where the CPU 41 also relates to other control of the video apparatus in accordance with the construction, it is now assumed that the CPU 41 relates only to the network control, which will be explained here, for convenience of explanation.

The LINK unit 42 is a portion to manage a function of a data link layer and its fundamental function is to transmit a packet of the transmission data to the PHY unit 43 and manage the transmission of the data packet received by the PHY unit 43 to a transaction layer and an application layer.

The PHY unit 43 is a portion to manage the electrical interface of the physical layer and its fundamental function is to serially convert parallel data from the LINK unit 42, generate an electric signal of the IEEE1394 standard, contrarily, return the electric signal of the IEEE1394 standard to the parallel data, and further, transmit it as parallel data to the LINK unit 42. Moreover, in the sole PHY unit 43, as a fundamental function of the serial bus, repetition, state recognition of the cable, initialization of the bus, arbitration, or the like is executed.

Communication layers of IEEE1394 are constructed by: three layers of a PHY layer, a LINK layer, and a TRANSACTION layer; and serial bus management. The physical layer corresponds to the PHY layer and the data link layer corresponds to the LINK layer, respectively.

Figure 5:
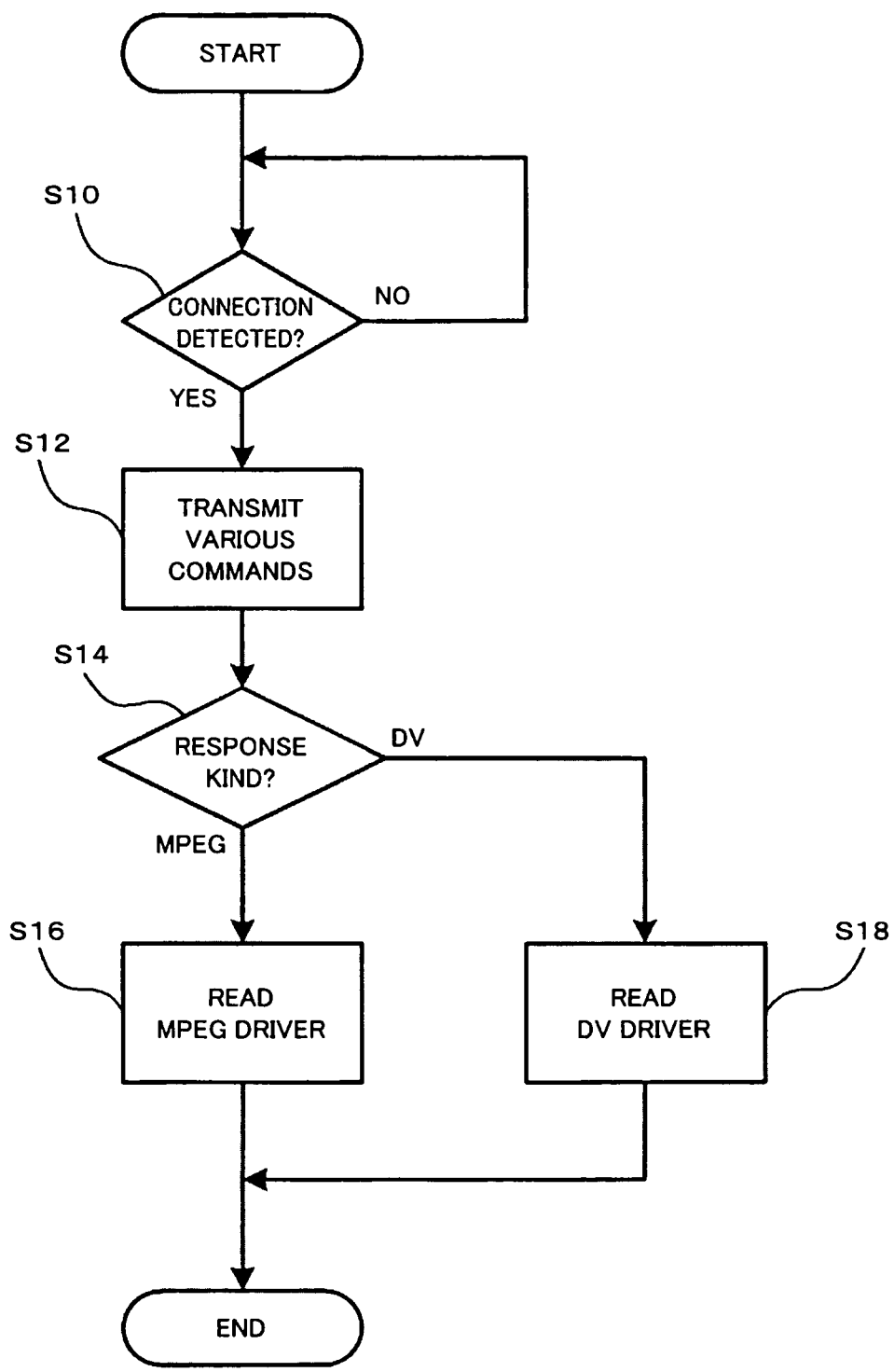
FIG. 5 is a flowchart showing a processing procedure in the case where the computer 11 receives video/audio signals from the video apparatus 10 via the IEEE1394 cable.

An example of a procedure in the case where the computer 11 selects the driver will now be described with reference to a flowchart of FIG. 5.

First, in step S10, the computer 11 detects whether or not the video apparatus 10 has been connected to the computer 11 through the IEEE1394 bus. Such a discrimination about the connection is repeated at least for a predetermined period (NO in step S10). When it is detected that the video apparatus 10 has been connected (YES in step S10), the computer 11 transmits an AV/C (Audio/Video Control) command (AV/C Digital Interface Command Set) such as Output_Plug_Signal_Format command or Output_Signal_Mode command to the video apparatus 10 in step S12.

Subsequently, whether the video apparatus 10 is an MPEG apparatus which transmits the video/audio signals of the HDV format (MPEG2 format) or the DV apparatus which transmits the video/audio signals of the DV format is discriminated on the basis of the kind of response to the AV/C command in step S14. Specifically speaking, it is determined that the video apparatus 10 which has returned a signal showing that the apparatus itself in response to at least one of those commands is the DV apparatus.

If it is decided in step S14 that the video apparatus 10 is the MPEG apparatus, the computer 11 reads the driver (MPEG driver) to receive the data of the MPEG format from the video apparatus 10 via the IEEE1394 bus in step S16.

On the other hand, if it is decided in step S14 that the video apparatus 10 is the DV apparatus, the computer 11 reads the driver (DV driver) to receive the data of the DV format from the video apparatus 10 via the IEEE1394 bus in step S18.

The MPEG driver and the DV driver conform with the MPEG transmission specification and the DV transmission specification of an AV protocol specified in IEEE1394, respectively. The computer 11 decodes the video/audio signals obtained through the MPEG driver and the DV driver as necessary and displays them onto the monitor or the like. It is also possible to control so as to record the video/audio signals onto a hard disk or the like of the computer 11.

As mentioned above, there is a case where if the signal having a format other than the corresponding formats is supplied to the driver which has selectively been read as mentioned above, an inconvenience such as hang-up of the computer 11 itself or the like is caused in dependence on the OS (Operating System).

An example of a menu to select the operating mode, format, and the like in the video apparatus 10 which can output the video/audio signals in a plurality of formats will now be described with reference to FIG. 6. Such a menu display screen is displayed on, for example, the monitor unit or finder unit of the video apparatus 10 by using the OSD (On-Screen Display) function. In order to enable the user to select each item displayed on the menu display screen, for example, buttons and switches arranged in the operation unit of the video apparatus 10 or an input unit of a type which functions as both of the dial and the button are used. Such a menu construction and selecting function are similar to those of a video apparatus 100 in the related art.

Figure 6:
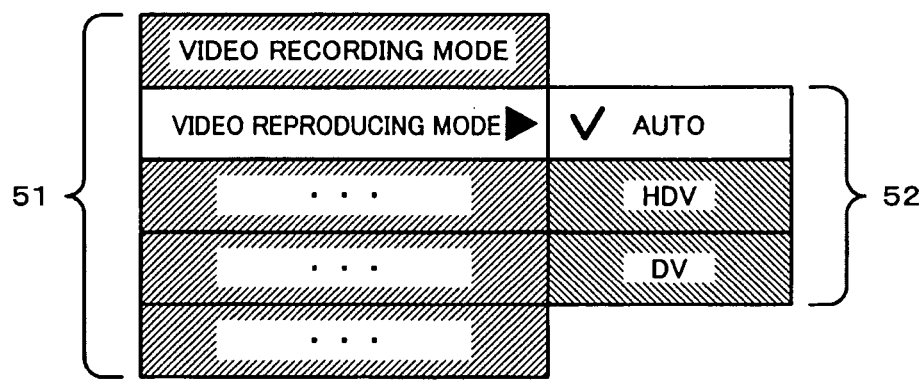
FIG. 6 is a schematic diagram showing an example of a menu display screen for setting a video reproducing mode in the video apparatus 10 according to the embodiment of the invention.

A menu 51 shown on the left side in FIG. 6 is used for the user to select the operating mode of the video apparatus 10. For example, one of the operating modes such as video recording mode, video reproducing mode, and the like is selected. In this case, an example in which the video reproducing mode has been selected is shown.

When the video reproducing mode is selected in the menu 51, a menu 52 is popped up on the right side. In the video reproducing mode, a desired format in which the video/audio signals are outputted is selected. The menu 52 is displayed in accordance with the mode selected in the menu 51. Therefore, the contents and the number of items which are displayed in the menu 52 can be changed in accordance with the item selected in the menu 51.

When "auto" is selected in the items of the menu 52, the video apparatus 10 reproduces the video/audio signals recorded in the recording media such as a cassette tape in the format used for the recording. For example, if the video apparatus 10 corresponds to the DV format and the HDV format, the video apparatus 10 outputs the DV signal or the MPEG signal. At this time, when the video apparatus 10 is connected to the computer 11 through the IEEE1394 bus, if it outputs the DV signal, the computer 11 regards the video apparatus 10 as a DV apparatus and reads the driver for DV. If it outputs the MPEG signal, the computer 11 regards the video apparatus 10 as an MPEG apparatus and reads the driver for MPEG.

In the case where the recording media in which the video/audio signals of the DV format and the HDV format have mixedly been recorded is reproduced by the video apparatus 100 in the related art, if the video/audio signals of a format different from the format used for the reproduction at a point of time when the video apparatus is connected to the computer 11 are reproduced, there is a risk to induce the hang-up of the computer 11 as mentioned above.

If "HDV" is selected in the menu 52, the video apparatus 100 outputs only the MPEG signal irrespective of the recording format on the recording media. An MPEG dummy signal is outputted with respect to the portion where the video/audio signals of the DV format have been recorded.

That is, as shown in FIG. 7A, when the HDV mode is selected, the MPEG recording portion is reproduced in the normal manner. When it is detected that the reproducing point enters the DV recording portion, the output to the interface unit 37 is stopped and, if necessary, the MPEG dummy signal is outputted. Subsequently, at a point of time when the next MPEG recording portion is searched for and detected by the fast-forward operation, high-speed reproduction, or the like, the operating mode is returned to the normal reproduction and the output to the interface unit 37 is also restarted.

The reproduction of the portion recorded in the format other than the selected format is skipped (fast-forward operation, high-speed reproduction, or the like) and the output is stopped for such a period of time. The operation to output the dummy signal in the selected format or the like can be also executed.

For example, as shown in FIG. 7B, when the MPEG mode is selected, the MPEG recording portion is reproduced in the normal manner, the DV recording portion is skipped, the output to the interface unit 37 is stopped for such a period of time, and if necessary, the MPEG dummy signal is outputted. Subsequently, at a point of time when the next MPEG recording portion is searched for and detected by the fast-forward operation, high-speed reproduction, or the like, the operating mode is returned to the normal reproduction and the output to the interface unit 37 is also restarted.

Therefore, even when the video apparatus is connected to the computer 11 at any point of time, the computer 11 reads the driver for MPEG. After that, so long as "HDV" is selected, the problem of the hang-up is avoided.

On the other hand, when "DV" is selected in the menu 52, the video apparatus 100 outputs only the DV signal irrespective of the recording format on the recording media. A DV dummy signal is outputted with respect to the portion where the video/audio signals of the MPEG format have been recorded.

That is, as shown in FIG. 8A, when the DV mode is selected, the DV recording portion is reproduced in the normal manner. When it is detected that the reproducing point enters the MPEG recording portion, the output to the interface unit 37 is stopped and, if necessary, the DV dummy signal is outputted. Subsequently, at a point of time when the next DV recording portion is searched for and detected by the fast-forward operation, high-speed reproduction, or the like, the operating mode is returned to the normal reproduction and the output to the interface unit 37 is also restarted.

The reproduction of the portion recorded in the format other than the selected format is skipped (fast-forward operation, high-speed reproduction, or the like) and the output is stopped for such a period of time. The operation to output the dummy signal in the selected format or the like can be also executed.

For example, as shown in FIG. 8B, when the DV mode is selected, the DV recording portion is reproduced in the normal manner, the MPEG recording portion is skipped, the output to the interface unit 37 is stopped for such a period of time, and if necessary, the DV dummy signal is outputted. Subsequently, at a point of time when the next DV recording portion is searched for and detected by the fast-forward operation, high-speed reproduction, or the like, the operating mode is returned to the normal reproduction and the output to the interface unit 37 is also restarted.

Therefore, even when the video apparatus is connected to the computer 11 at any point of time, the computer 11 reads the driver for DV. After that, so long as "DV" is selected, the problem of the hang-up is avoided.

On the contrary, after "HDV" was selected in the menu 52 and the video apparatus was connected to the computer 11, if it is switched so as to select "DV" in the menu 52 or after "DV" was selected in the menu 52 and the video apparatus was connected to the computer 11, if it is switched so as to select "HDV" in the menu 52, there is a possibility that the computer 11 hangs up.

However, even in the case of switching the selection as mentioned above, if the user pulls out the IEEE1394 cable once (from the video apparatus 100 or the computer 11) and inserts it again, since the computer 11 newly reads the driver corresponding to the switched format, no problems occur. However, if "auto" has been selected in the menu 52 and the DV signal and the MPEG signal have mixedly been recorded in the recording media, it is difficult for the user to pull out and re-insert the cable each time the recording format changes, and the problem of the hang-up still remains.

The above situation occurring with respect to the video apparatus 100 in the related art will now be specifically explained with reference to FIGS. 9 to 14. FIG. 9 shows the case where "auto" has been selected as a video reproducing mode ("auto" has been selected in the menu 52) and the video/audio signals recorded in the recording media have been changed from the MPEG signal to the DV signal during the reproduction because of the mixed recording.

Initially, the MPEG signal is outputted from the video apparatus 100 in the related art and the computer 11 reads the driver for MPEG in correspondence to it. However, when the DV signal is outputted from the video apparatus 100 during the reproduction, since the driver for MPEG has already been read and held in the computer 11, the hang-up occurs at this point of time.

FIG. 10 shows the case where a change pattern of the video/audio signals is opposite to that shown in FIG. 9. That is, it shows the case where "auto" has been selected as a video reproducing mode ("auto" has been selected in the menu 52) and the video/audio signals recorded in the recording media have been changed from the DV signal to the MPEG signal during the reproduction because of the mixed recording.

Initially, the DV signal is outputted from the video apparatus 100 and the computer 11 reads the driver for DV in correspondence to it. However, when the MPEG signal is outputted from the video apparatus 100 during the reproduction, since the driver for DV has already been read and held in the computer 11, the hang-up occurs at this point of time.

FIG. 11 shows the case where "HDV" has been selected as a video reproducing mode ("HDV" has been selected in the menu 52) and the video/audio signals recorded in the recording media have been changed from the MPEG signal to the DV signal during the reproduction because of the mixed recording.

Initially, the MPEG signal is outputted from the video apparatus 100 and the computer 11 reads the driver for MPEG in correspondence to it. After that, the video/audio signals recorded in the recording media become the DV signal. However, since the video reproducing mode of the video apparatus 100 is "HDV", the dummy signal (MPEG dummy signal) of the MPEG format is outputted. Since the computer 11 processes the signal by the same driver for MPEG as that used for the reading, the problem of the hang-up does not occur. In this case, however, although the hang-up can be avoided, since the portion recorded in the DV format becomes the MPEG dummy signal, it is difficult to monitor the relevant portion.

FIG. 12 shows the case where "DV" has been selected as a video reproducing mode ("DV" has been selected in the menu 52) and the video/audio signals recorded in the recording media have been changed from the DV signal to the MPEG signal during the reproduction because of the mixed recording.

Initially, the DV signal is outputted from the video apparatus 100 and the computer 11 reads the driver for DV in correspondence to it. After that, the video/audio signals recorded in the recording media become the MPEG signal. However, since the video reproducing mode of the video apparatus 100 is "DV", the dummy signal (DV dummy signal) of the DV format is outputted. Since the computer 11 processes the signal by the same driver for DV as that used for the reading, the problem of the hang-up does not occur. In this case, however, although the hang-up can be avoided, since the portion recorded in the MPEG format becomes the DV dummy signal, it is difficult to monitor the relevant portion.

FIG. 13 shows the case where "HDV" has been selected as a video reproducing mode ("HDV" has been selected in the menu 52) and it shows the case where only the video/audio signals of the MPEG format have been recorded in the recording media and the video reproducing mode has been switched to "DV" by the erroneous operation or the like of the user during the reproduction of the MPEG signal.

Initially, the MPEG signal is outputted from the video apparatus 100 and the computer 11 reads the driver for MPEG in correspondence to it. After that, since the video reproducing mode of the video apparatus 100 is forcedly switched to "DV" in spite of the fact that only the video/audio signals of the MPEG format have been recorded in the recording media, the dummy signal (DV dummy signal) of the DV format is outputted. Since the computer 11 processes the signal by the same driver for MPEG as that used for the reading, the problem of the hang-up occurs.

FIG. 14 shows the case where "DV" has been selected as a video reproducing mode ("DV" has been selected in the menu 52) and it shows the case where only the video/audio signals of the DV format have been recorded in the recording media and the video reproducing mode has been switched to "HDV" by the erroneous operation or the like of the user during the reproduction of the DV signal.

Initially, the DV signal is outputted from the video apparatus 100 and the computer 11 reads the driver for DV in correspondence to it. After that, since the video reproducing mode of the video apparatus 100 is forcedly switched to "HDV" in spite of the fact that only the video/audio signals of the DV format have been recorded in the recording media, the dummy signal (MPEG dummy signal) of the MPEG format is outputted. Since the computer 11 processes the signal by the same driver for DV as that used for the reading, the problem of the hang-up occurs.

A method of avoiding the problem of the hang-up in the video apparatus 10 according to the invention will now be described with reference to FIG. 15. In the video apparatus 10 shown in FIG. 15, initially, "HDV" is selected as a video reproducing mode and the computer 11 reads the driver for MPEG at the time of connection. Since the video reproducing mode is "HDV", the signal of the MPEG format is outputted without limiting the format of the video/audio signals recorded in the recording media to the MPEG format or the DV format. In other words, when the video/audio signals of the MPEG format have been recorded in the recording media, the MPEG signal is outputted. In the case of the DV format, the MPEG dummy signal is outputted.

When the video reproducing mode is switched from "HDV" to "DV" by the user and the DV signal is outputted to the computer 11, the video apparatus 10 makes control so as to disconnect the connection of the IEEE1394 bus between the video apparatus 10 and the computer 11 once and, after the elapse of a predetermined time, connect them again.

By making such control, at the time of the re-connection, the computer 11 can read the driver for DV and normally receive the DV signal outputted from the video apparatus 10. While the control of the disconnection and re-connection of the video apparatus 10 is made substantially without pulling out and inserting the IEEE1394 cable, an effect similar to that obtained in the case where the IEEE1394 cable has been pulled out and inserted is derived in the computer 11.

Figure 15:
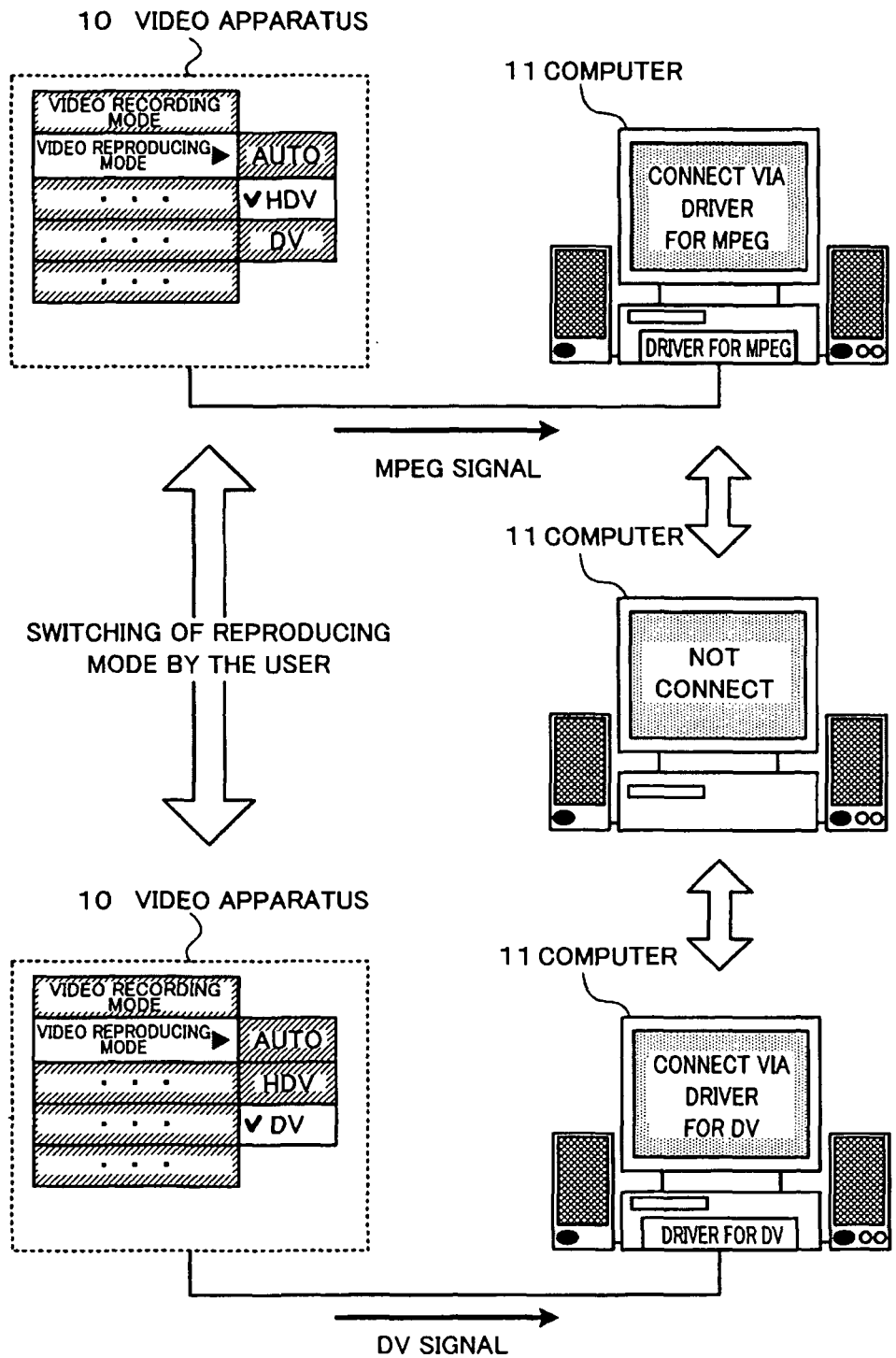
FIG. 15 is a schematic diagram conceptually showing the operation of the computer 11 in the case where a reproducing mode is switched during the output of video/audio signals in the video apparatus 10 according to the embodiment of the invention.

FIG. 15 shows the example in which the user has switched the video reproducing mode from "HDV" to "DV" by some reason in spite of the fact that the video/audio signals of the HDV format have been recorded in the recording media. However, even in the opposite case where the video reproducing mode is switched from "DV" to "HDV" in spite of the fact that the video/audio signals of the DV format have been recorded in the recording media, the problem of the hang-up can be avoided by control similar to that for the video apparatus 10.

It is also possible to construct the apparatus in such a manner that when the video reproducing mode has been set to "auto", if the format of the video/audio signals recorded in the recording media is changed from the HDV format to the DV format (or, on the contrary, changed from the DV format to the HDV format), the video apparatus 10 detects such a format change and makes the control of the disconnection and re-connection mentioned above.

A procedure for the video apparatus 10 to realize the processes shown in FIG. 15 will now be described with reference to a flowchart of FIG. 16. In this example, the interface control unit 36 of the video apparatus 10 which detected that the format of the video/audio signals to be outputted has been switched resets an IC (Integrated Circuit) substantially constructing the interface unit 37 once and, after the elapse of a predetermined time, cancels the resetting state. After that, the interface control unit 36 detects by itself the disconnection (shut-off) from the IEEE1394 bus due to the resetting of the interface unit 37 and executes processes similar to the processes which are executed in the case where the cable has been pulled out in the normal state.

Further, after that, the interface control unit 36 detects by itself the connection to the IEEE1394 bus due to the cancellation of the resetting of the interface unit 37 and executes processes similar to the processes which are executed in the case where the cable has been inserted in the normal state.

As a method of disconnecting from the IEEE1394 bus as mentioned above, for example, there are the following methods although it depends on the construction of the interface control unit 36.

(1) The video apparatus is disconnected from the IEEE1394 bus by stopping the IC corresponding to the interface unit 37.

(2) The video apparatus is disconnected from the IEEE1394 bus by stopping the interface control unit 36 including the CPU 41.

(3) The video apparatus is disconnected from the IEEE1394 bus by turning off a power source of the video apparatus 10 itself. In this case, the video apparatus 10 needs to have a power source unit for controlling the turn-off/turn-on of the power source.

Figure 16:
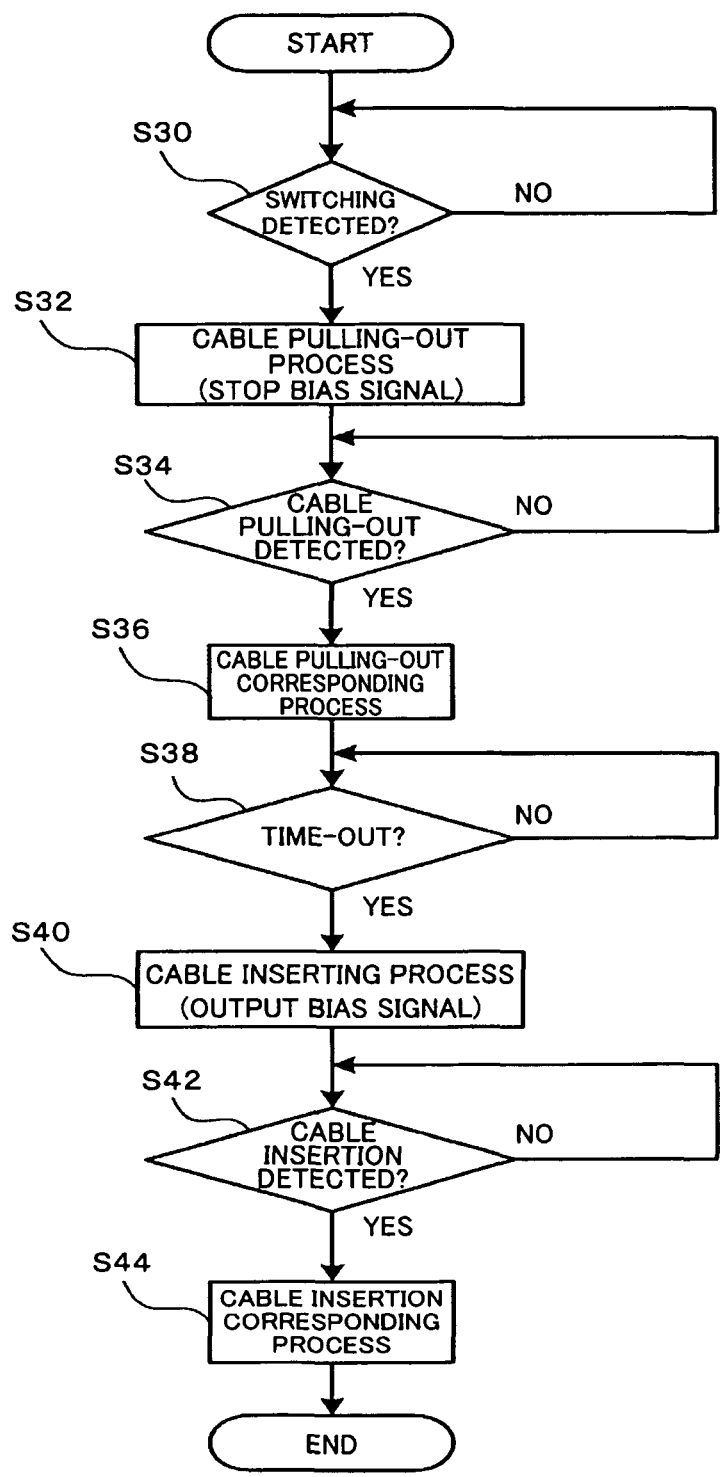
FIG. 16 is a flowchart showing a virtual processing procedure for the pulling-out and insertion of the IEEE1394 cable in the video apparatus 10 according to the embodiment of the invention.

In the flowchart of FIG. 16, first, in step S30, whether or not the video reproducing mode has been switched is detected. In this detection, the switching operation in which the user switched from "HDV" to "DV" or from "DV" to "HDV" by operating the menu display screen is detected. In the case of "auto", it is detected that the format of the video/audio signals recorded in the recording media has been switched.

The process of step S30 is repetitively executed for a predetermined time until the mode or the format is switched (NO in step S30). When the switching of the video reproducing mode or the switching of the format of the video/audio signals to be outputted is detected (YES in step S30), the process to pull out the cable is executed in step S32. In this case, the IEEE1394 cable is not physically pulled out of the video apparatus 10 or the computer 11 but it means a logical disconnection from the network. For example, such a cable pulling-out process is a process for stopping a predetermined bias signal. More specific forms of such a process will be described hereinafter with reference to FIGS. 17 and 18.

When the cable pulling-out process is executed in the video apparatus 10, in step S34, the video apparatus 10 detects whether or not the cable has (logically) been pulled out.

When the logical pulling-out of the cable is detected in step S34 (YES in step S34), the cable pulling-out corresponding process is executed in step S36. This process is similar to the process which is executed in the video apparatus 10 in the case where the cable has been pulled out in the normal state.

The video apparatus 10 repeats a processing loop for a predetermined period in step S38, thereby delaying the next process of step S40. Such a delaying process is executed to avoid such a situation that if the cable pulling-out/inserting process is executed too fast, the detecting process of the computer 11 side is difficult to catch up with it, and the computer 11 eventually determines that the cable pulling-out/inserting process is not executed.

In step S40. the process to insert the cable is executed. In this case, the video apparatus 10 and the computer 11 are not physically connected by the IEEE1394 cable but it means a logical re-connection of the IEEE1394 bus. For example, such a cable inserting process is a process for outputting the predetermined bias signal. More specific forms of such a process will be described hereinafter with reference to FIGS. 17 and 18.

When the cable inserting process is executed in step S40, in step S42, the video apparatus 10 detects whether or not the cable has (logically) been inserted.

When the logical insertion of the cable is detected in step S42 (YES in step S42), the cable insertion corresponding process is executed in step S44. This process is similar to the process which is executed by the video apparatus 10 in the case where the cable has been inserted in the normal state.

Figure 17:
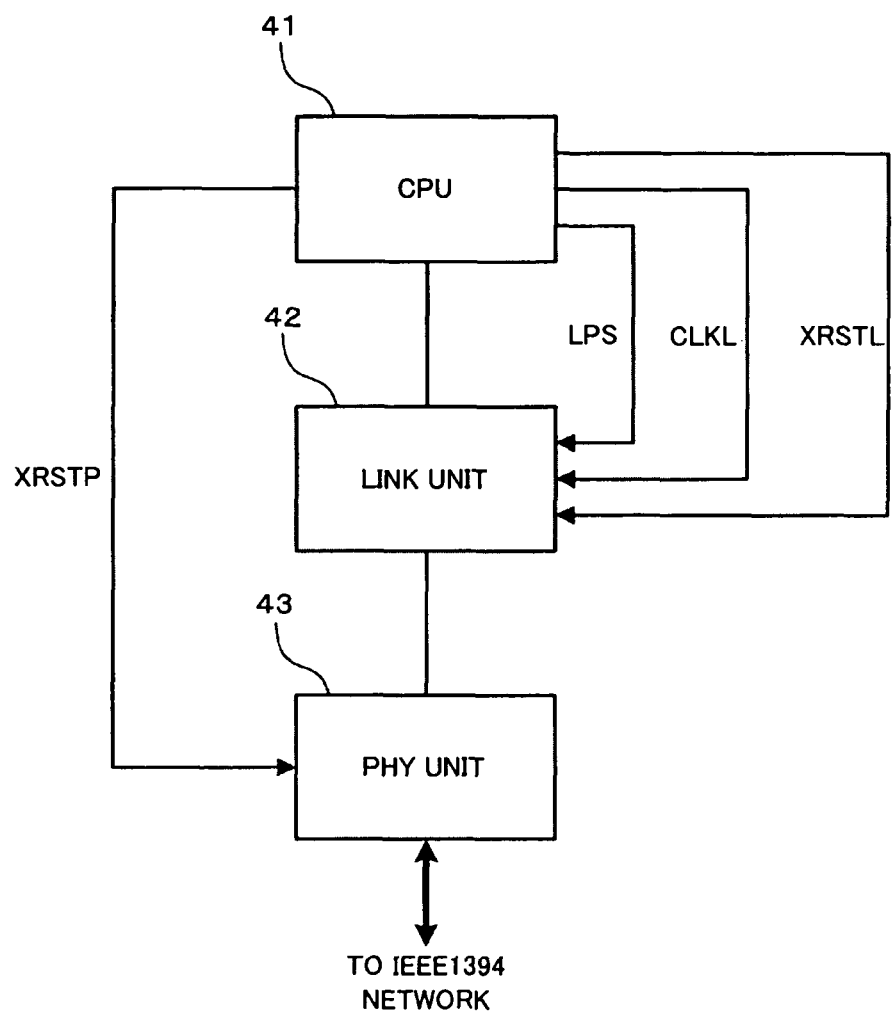
FIG. 17 is a schematic diagram showing the details of the virtual process for the pulling-out and insertion of the IEEE1394 cable in the video apparatus 10 according to the embodiment of the invention.

Transmission and reception of signals among the CPU 41, LINK unit 42, and PHY unit 43 shown in FIG. 4 will now be described with reference to FIG. 17. An LPS signal shows a power status of the LINK unit 42. For example, if a value of the LPS signal is equal to "1", this means that the LINK unit 42 is active (ON). If it is equal to "0", this means that the LINK unit 42 is inactive (OFF).

A CLKL signal is clock information which is provided to the LINK unit 42. If the CLKL signal is equal to "1", this means that a clock has been provided to the LINK unit 42. If it is equal to "0", this means that the supply of the clock is stopped. If an XRSTL signal is equal to "1", the reset state of the LINK unit 42 is cancelled and the clock is provided to the LINK unit 42. If it is equal to "0", the reset state of the LINK unit 42 is held and the supply of the clock to the LINK unit 42 is stopped.

If an XRSTP signal is equal to "1", the reset state of the PHY unit 43 is cancelled and the clock is provided to the PHY unit 43. If it is equal to "0", the reset state of the PHY unit 43 is held and the supply of the clock to the PHY unit 43 is stopped.

Figure 18A:
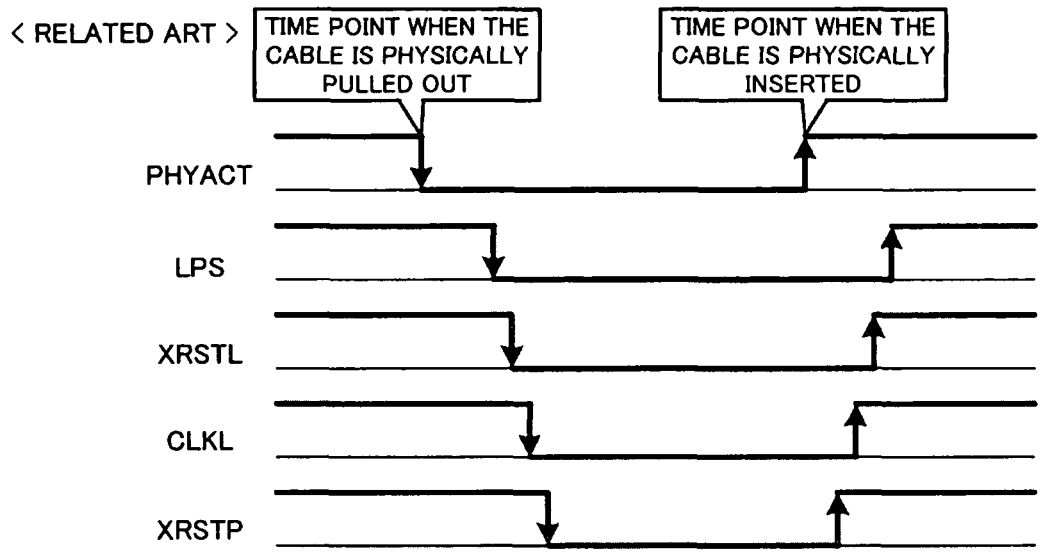
FIGS. 18A and 18B are timing charts showing change timing of various signals in the virtual process for the pulling-out and insertion of the IEEE1394 cable in the video apparatus 10 according to the embodiment of the invention in comparison with those in the method in the related art.
Figure 18B:
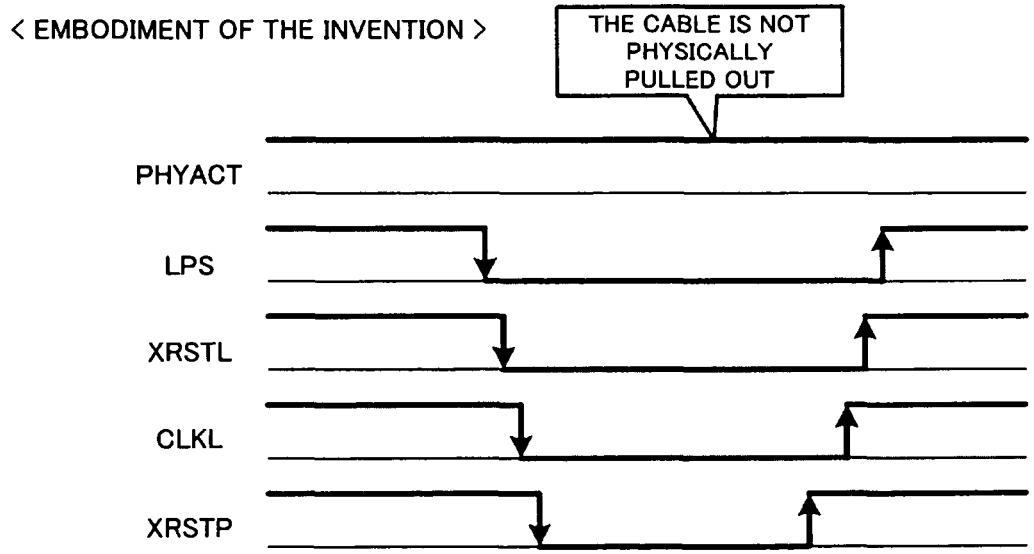

A procedure in which the video apparatus 10 of the invention controls the disconnection and the re-connection of the IEEE1394 bus will now be described with reference to FIGS. 18A and 18B while showing transmission timing of each signal shown in FIG. 17. FIG. 18A shows timing of each signal in the video apparatus in the related art. FIG. 18B shows timing of each signal in the video apparatus 10 of the invention. In both of the cases of FIGS. 18A and 18B, it is presumed that the CPU 41, LINK unit 42, and PHY unit 43 are constructed by individual chips (that is, the 3-chip construction shown in FIG. 4 is used).

In FIG. 18A, first, the IEEE1394 cable is physically pulled out. This is shown by a change from the high level to the low level of a PHYACT signal. After that, the LPS signal is changed from "1" to "0" in response to the pulling-out of the IEEE1394 cable. This is because since the situation where the LINK state is referred to from another apparatus on the same IEEE1394 bus is considered, it is necessary to show the fact that the LINK unit is stopped due to the pulling-out of the cable.

After that, the XRSTL signal is changed from "1" to "0", thereby actually stopping the LINK unit (the LINK unit is reset and the reception of the clock is stopped). Further, after the elapse of a predetermined period since then, the CLKL signal is changed from "1" to "0", thereby stopping the supply of the clock to the LINK unit.

After that, the XRSTP signal is changed from "1" to "0", thereby stopping the PHY unit (the PHY unit is reset and the reception of the clock is stopped).

At this point of time, the video apparatus is physically disconnected from the IEEE1394 bus to which it has so far been connected. For example, even if the operation to display a list of connected apparatuses is executed by another apparatus on the network, this video apparatus is not displayed.

After that, when the IEEE1394 cable is physically inserted (the PHYACT signal is changed from the low level to the high level), it is detected and each signal is returned from "0" to "1" in order opposite to that mentioned above, that is, in order of the XRSTP signal→the CLKL signal→the XRSTL signal→the LPS signal. By this control, the functions of the physical layer and the data link layer are activated in predetermined order, the video apparatus 100 is connected to the IEEE1394 bus. At this point of time, the driver of the format according to the video reproducing mode of the video apparatus 100 is read out by the computer 11.

In FIG. 18A, merely by physically pulling out and inserting the IEEE1394 cable, the video apparatus is disconnected once from the IEEE1394 bus and the proper driver is read by the computer 11 side upon re-connection. According to the invention, however, such an effect is derived without physically pulling out and inserting the IEEE1394 cable.

The above point will be described with reference to FIG. 18B. As described in FIG. 18A, when the IEEE1394 cable is physically pulled out and inserted, the PHYACT signal is changed from the high level to the low level or from the low level to the high level. However, since the physical pulling-out and insertion of the IEEE1394 cable are not executed here in the invention, the PHYACT signal is not changed.

According to the video apparatus 10, in the interface control unit 36, when it is detected that the user has switched the video reproducing mode, for example, from "HDV" to "DV" or from "DV" to "HDV" by the menu operation or when the video reproducing mode is "auto" and it is detected that the format of the video/audio signals recorded in the recording media has been changed, the interface unit 37 (the LINK unit 42 and the PHY unit 43) is reset once and, after the elapse of a predetermined time, the reset state is cancelled again.

This process will be described in more detail. When it is detected that the user has switched the video reproducing mode, for example, from "HDV" to "DV" or from "DV" to "HDV" by the menu operation or when the video reproducing mode is "auto" and it is detected that the format of the video/audio signals recorded in the recording media has been changed, first, the video apparatus 10 changes the LPS signal from "1" to "0".

This is because since a case where the LINK state is referred to from another apparatus on the same IEEE1394 bus is considered, it is necessary to show the fact that the LINK unit 42 stops the operation before the video apparatus is disconnected from the IEEE1394 bus. If the LINK unit 42 is in the inoperative mode, since the response from the outside is invalidated, so that an inquiry of the upper layer by the LINK unit 42 is not performed and such a situation that an illegal response is made at the time of the status transition can be prevented.

After the LPS signal is changed in this manner, the XRSTL signal is changed from "1" to "0", thereby stopping the LINK unit (that is, the LINK unit is reset and the reception of the clock is stopped). Further, after that, the CLKL signal is changed from "1" to "0", thereby stopping the supply of the clock to the LINK unit.

Moreover, after that, the XRSTP signal is changed from "1" to "0", thereby stopping the PHY unit (that is, the PHY unit is reset and the reception of the clock is stopped).

By the above processes, the video apparatus 10 is logically disconnected from the IEEE1394 bus to which it has so far been connected. For example, even if the operation to display a list of connected apparatuses is executed by another apparatus on the network, this video apparatus is not displayed.

The XRSTP signal is maintained at the "0" level for a predetermined time. This predetermined time is a time enough for the computer 11 side to detect the disconnection of the video apparatus 10 from the IEEE1394 bus and invalidate the driver which has so far been read in order to cope with the video apparatus 10 (for example, delete the driver from a predetermined memory area).

After the elapse of the predetermined time, each signal is returned from "0" to "1" in order opposite to that mentioned above, that is, in order of the XRSTP signal→the CLKL signal→the XRSTL signal→the LPS signal. By this control, the functions of the physical layer and the data link layer are activated in predetermined order, the video apparatus 10 is connected to the IEEE1394 bus again. At this point of time, the driver of the format according to the video reproducing mode of the video apparatus 10 is read out by the computer.

According to the invention, when the format to be outputted from the video apparatus 10 is changed, the disconnection/re-connection from/to the IEEE1394 bus are virtually controlled. Therefore, in the computer 11, the corresponding proper driver can be read in response to it, so that an inconvenience such as hang-up or the like can be avoided.

Although the disconnecting/re-connecting processes have been described in this example on the assumption that the CPU 41, LINK unit 42, and PHY unit 43 are constructed by the individual chips (that is, the 3-chip construction), similar processes can be also realized by another construction. For example, if the chip construction is changed, there is a possibility that a unit for resetting or a unit for cancelling the reset varies.

Although the embodiment of the invention has been described with respect to the example in which the video apparatus 10 and the computer 11 are connected to the IEEE1394 bus, the technical idea of the invention can be also applied to another network connection. Furthermore, the invention can be applied not only to the wired connection but also to wireless connection.

Figure 19:
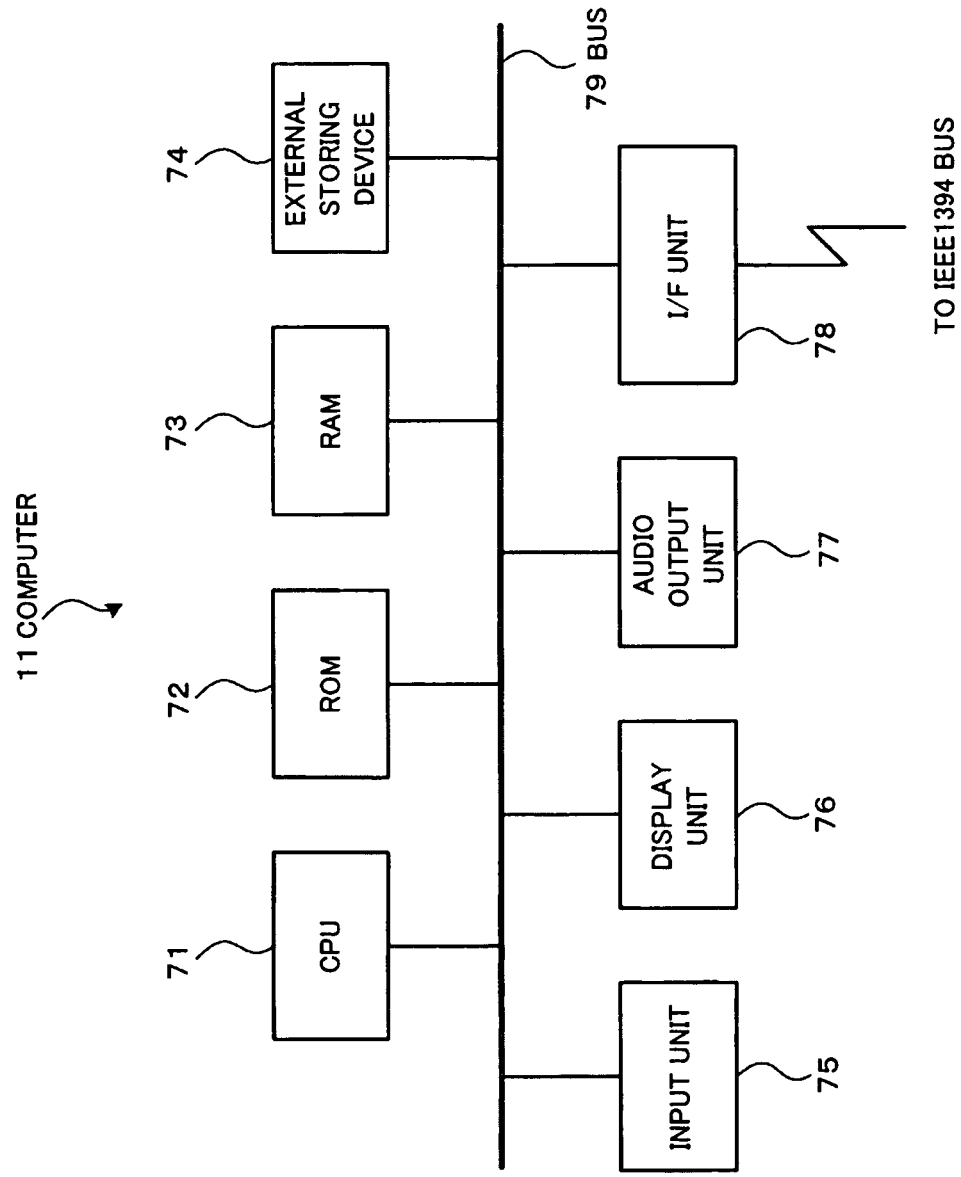
FIG. 19 is a block diagram showing an example of a construction of the computer 11.

The fundamental construction of the computer 11 will now be described with reference to FIG. 19. The computer 11 includes: a CPU (Central Processing Unit) 71; a ROM (Read Only Memory) 72; a RAM (Random Access Memory) 73; an external storing device 74; an input unit 75; a display unit 76; an audio output unit 77; an interface unit 78; and a bus 79 for mutually connecting those component elements.

The CPU 71 controls the operation of each component element, controls the transmission and reception of data among those component elements, and executes commands according to programs. For example, image/audio processes such as a decoding process and the like of the video/audio signals which are provided from the video apparatus 10 are also executed as necessary under control of the CPU 71.

The ROM 72 is a non-volatile memory device in which data is not deleted even if the power source is turned off. Codes which are first executed by the CPU 71 when the power source of the computer 11 is turned on and the like have been stored in the ROM 72.

A program which is being executed; data which is used for such a program, and the like are loaded into the RAM 73. When the video apparatus 10 is connected through the IEEE1394 bus, the driver which is selected in accordance with the format of the video/audio signals which are provided from the video apparatus 10 is also loaded (read) into the RAM 73. The video/audio signals from the video apparatus 10 are inputted into the computer 11 via processes of the driver program.

The external storing device 74 is a storing device such as a hard disk or the like in which various programs and data have been stored. Modules of the drivers which are loaded into the RAM 73 can be also stored in the external storing device 74. The input unit 75 is input means such as keyboard, mouse, or the like. The user instructs the CPU 71 to execute a predetermined process by using the input means.

The display unit 76 is a monitor such as LCD (Liquid Crystal Display), CRT (Cathode Ray Tube), or the like. By watching the contents displayed on the monitor, the user receives necessary information and makes a predetermined instruction on the basis of the menu display screen or the like displayed here. The video signal sent from the video apparatus 10 is displayed by the display unit 76 and the video image recorded by the video apparatus 10 is reproduced.

The audio output unit 77 is, for example, a speaker. The audio signal transmitted from the video apparatus 10 is outputted from the audio output unit 77 and the sound recorded by the video apparatus 10 is reproduced.

The interface unit 78 is provided to realize the connection of the video apparatus to the IEEE1394 bus. The video/audio signals provided from the video apparatus 10 are sent to the driver through the interface unit 78, subjected to the necessary decoding process and the like, and thereafter, outputted to the display unit 76 and the audio output unit 77.

The computer 11 is, for example, a personal computer. However, an arbitrary apparatus can be used as a computer 11 so long as it has the foregoing component elements and receives the video/audio signals from the video apparatus 10 by predetermined dedicated software (driver).

It should be understood by those skilled in the art that various modifications, combinations, sub-combinations, and alterations may occur depending on design requirements and other factors insofar as they are within the scope of the appended claims or the equivalents thereof.

What is claimed is:

1. A video apparatus comprising:
    signal control means for outputting an image signal in a plurality of formats;
    interface means for connecting said video apparatus to a computer; and
    interface control means for controlling transmission so as to transmit said image signal to said computer by using said interface means, wherein when the video apparatus has been connected to said computer through said interface means, said interface control means controls said interface means to automatically and logically disconnect the connection to said computer without changing a physical connecting state and without user intervention, in response to a detecting result indicating that the format of said image signal is switched and, after the elapse of a predetermined period, the video apparatus is connected to said computer again without changing the physical connecting state.

2. An apparatus according to claim 1, wherein said predetermined period is set to a time which is equal to or longer than a time during which said computer can detect the disconnection of said connection.

3. An apparatus according to claim 1, wherein
said interface means is an IEEE1394 interface; and
said interface control means further comprising:
data link layer managing means for managing a function in a data link layer; and
physical layer managing means for managing a function in a physical layer;
wherein the disconnection and the re-connection of said connection are realized by controlling said data link layer managing means and said physical layer managing means.

4. An apparatus according to claim 3, wherein
said interface control means controls execution of said disconnection by stopping the functions of said data link layer managing means and said physical layer managing means; and
executes said re-connection by restarting said stopped functions of said data link layer managing means and said physical layer managing means.

5. An apparatus according to claim 3, wherein
each of said data link layer managing means and said physical layer managing means is constructed by one chip, and
said interface control means
executes said disconnection by rescuing each of said chips and
executes said re-connection by cancelling the reset state of each of said chips.

6. An apparatus according to claim 5, wherein
said interface control means
resets the chip corresponding to said data link layer managing means and, thereafter, resets the chip corresponding to said physical layer managing means at the time of said disconnection, and
cancels the reset state of the chip corresponding to said physical layer managing means and, thereafter, cancels the reset state of the chip corresponding to said data link layer managing means at the time of said re-connection.

7. An apparatus according to claim 3, wherein
each of said data link layer managing means and said physical layer managing means is constructed by one chip, and
said interface control means
executes said disconnection by resetting said one chip and
executes said re-connection by cancelling the reset state of said one chip.

8. An apparatus according to claim 1, wherein
the switching of the format of said image signal is switching from a DV format to an HDV format or switching from the HDV format to the DV format.

9. An apparatus according to claim 1, wherein
the switching of the format of said image signal is made by an instruction of the user.

10. An apparatus according to claim 1, wherein
said image signal is recorded into a same recording media irrespective of a difference of said formats and
the switching of the format of said image signal is performed by sequentially reproducing said image signal of the different formats recorded in said recording media.

11. A video output control method comprising:
a transmitting step of controlling so that an image signal which can be outputted in a plurality of formats is transmitted to a computer through interface means for connecting a video apparatus to said computer; and
a disconnecting/re-connecting step of, when the video apparatus has been connected to said computer in said transmitting step, controlling said interface means to automatically and logically disconnect the connection to said computer without changing a physical connecting state and without user intervention, in response to a detecting result indicating that the format of said image signal is switched, and further after the elapse of a predetermined period, to connect the video apparatus to said computer again without changing the physical connecting state.

12. A method according to claim 11, wherein said predetermined period is set to a time which is equal to or longer than a time during which said computer can detect the disconnection of said connection.

13. A method according to claim 11, wherein
said interface means is an IEEE1394 interface, and
said disconnecting/re-connecting step further comprises:
a data link layer managing step of managing a function in a data link layer and
a physical layer managing step of managing a function in a physical layer, and
the disconnection and the re-connection of said connection are realized by controlling operations in said data link layer managing step and said physical layer managing step.

14. A method according to claim 13, wherein
in said disconnecting/re-connecting step,
said disconnection is executed by stopping the operations of said data link layer managing step and said physical layer managing step and
said re-connection is executed by restarting said stopped operations of said data link layer managing step and said physical layer managing step.

15. A method according to claim 13, wherein
each of said data link layer managing step and said physical layer managing step is realized by one chip, and
in said disconnecting/re-connecting step,
said disconnection is executed by resetting each of said chips and
said re-connection is executed by cancelling the reset state of each of said chips.

16. A method according to claim 15, wherein
in said disconnecting/re-connecting step,
the chip which realizes said data link layer managing step is reset and, thereafter, the chip which realizes said physical layer managing step is reset at the time of said disconnection, and
the reset state of the chip which realizes said physical layer managing step is cancelled and, thereafter, the reset state of the chip which realizes said data link layer managing step is cancelled at the time of said re-connection.

17. A method according to claim 13, wherein
each of said data link layer managing step and said physical layer managing step is realized by one chip, and
in said disconnecting/re-connecting step, said disconnection is executed by resetting said one chip and said re-connection is executed by cancel mg the reset state of said one chip.

18. A method according to claim 11, wherein
the switching of the format of said image signal is switching from a DV format to an HDV format or switching from the HDV format to the DV format.

19. A method according to claim 11, wherein
the switching of the format of said image signal is made by an instruction of the user.

20. A method according to claim 11, wherein
said image signal is recorded into a same recording media irrespective of a difference of said formats and
the switching of the format of said image signal is performed by sequentially reproducing said image signal of the different formats recorded in said recording media.

21. A reproduction control method in a recording/reproducing apparatus having a recording/reproducing function of recording/reproducing a signal through a recording medium so that a plurality of signal formats mixedly exist and a communicating function of establishing connection to an external apparatus and outputting a reproduction signal, comprising:

a transmitting step of controlling so that a video signal which can be outputted in a plurality of formats is transmitted to said external apparatus through interface means for connecting said recording/reproducing apparatus to said external apparatus;

a disconnecting/re-connecting step of, when the recording/reproducing apparatus has been connected to said external apparatus in said transmitting step, controlling said interface means to automatically and logically disconnect the connection to said external apparatus without changing a physical connecting state and without user intervention, in response to a detecting result indicating that the format of said image signal is switched, and further after the elapse of a predetermined period, to connect the recording/reproducing apparatus to said external apparatus again without changing the physical connecting state; and a reproduction control step of controlling the reproducing operation of said recording/reproducing apparatus, wherein in said reproduction control step, when a reproducing mode has been set to a specific reproducing mode, the reproduction of a recording portion of the format which does not correspond to said reproducing mode is skipped.

22. A reproduction control method in a recording/reproducing apparatus having a recording/reproducing function of recording/reproducing a signal through a recording medium so that a plurality of signal formats mixedly exist and a communicating function of establishing connection to an external apparatus and outputting a reproduction signal, comprising:

a transmitting step of controlling so that a video signal which can be outputted in a plurality of formats is transmitted to said-external apparatus through interface means for connecting said recording/reproducing apparatus to said external apparatus;

a disconnecting/re-connecting step of, when the recording/reproducing apparatus has been connected to said external apparatus in said transmitting step, controlling said interface means to automatically and logically disconnect the connection to said external apparatus without changing a physical connecting state and without user intervention, in response to a detecting result indicating that the format of said image signal is switched, and further after the elapse of a predetermined period, to connect the recording/reproducing apparatus to said external apparatus again without changing the physical connecting state; and a video output control step of controlling the video output operation of said recording/reproducing apparatus, wherein in said the video output control step, when a reproducing mode has been set to a specific reproducing mode, a dummy signal of a format corresponding to said reproducing mode is outputted at the time of the reproduction of a recording portion of the format which does not correspond to said reproducing mode.

23. A video apparatus comprising:

a signal control unit configured to output an image signal in a plurality of formats;

an interface unit configured to connect said video apparatus to a computer; and an interface control unit configured to control so as to transmit said image signal to said computer by using said interface unit, wherein in the case where the video apparatus has been connected to said computer through said interface unit, said interface control unit controls said interface unit to automatically and logically disconnect the connection to said computer without changing a physical connecting state and without user intervention, in response to a detecting result indicating that the format of said image signal is switched and, further after the elapse of a predetermined period, the video apparatus is connected to said computer again without changing the physical connecting state.

* * * * *